(12) United States Patent   (10) Patent No.: US 12,686,265 B2
Heath et al.                     (45) Date of Patent: *Jul. 21, 2026

(54) POSITIVE DRIVE DIFFERENTIAL

(71) Applicant: The Hiliard Corporation, Elmira, NY (US)

(72) Inventors: Kelly P. Heath, Corning, NY (US); James E. Palmer, Elmira Heights, NY (US); John Updyke, Big Flats, NY (US)

(73) Assignee: The Hilliard Corporation, Elmira, NY (US)

( * ) Notice: Subject to any disclaimer, the term of this patent is extended or adjusted under 35 U.S.C. 154(b) by 362 days.

This patent is subject to a terminal disclaimer.

(21) Appl. No.: 18/214,630

(22) Filed: Jun. 27, 2023

(65) Prior Publication Data

US 2024/0262191 A1     Aug. 8, 2024

Related U.S. Application Data

(63) Continuation of application No. 18/166,096, filed on Feb. 8, 2023, now Pat. No. 12,496,902.

(51) Int. Cl.
B60K 23/08          (2006.01)
(52) U.S. Cl.
CPC .. B60K 23/0808 (2013.01); *B60K 2023/0841* (2013.01)
(58) Field of Classification Search
CPC ........ B60K 23/0808; B60K 2023/0841; B60K 17/352; B60K 23/08; B60K 17/3462; F16H 48/16
See application file for complete search history.

(56) References Cited

U.S. PATENT DOCUMENTS 5,971,123 A   10/1999 Ochab et al.
6,629,590 B2  10/2003 Ochab et al.
(Continued)

FOREIGN PATENT DOCUMENTS

EP   1707837 A1   10/2006
EP   4056295 A1    9/2022

OTHER PUBLICATIONS

2020 Can. Am Maverick Max Turbo RR—STD XDS XRS—North America Gear Box and Components, 3 pages https://www.canampartshouse.com/oemparts/a/cam/62a7a6e380771a918f440d4b/gear-box-and-components (p. 1) https://www.canampartshouse.com/oemparts/a/cam/62a7a6e380771a918f440d47/gear-box-1 (p. 2); and https://www.canampartshouse.com/oemparts/a/cam/62a7a6e380771a918f440d4a/gear-box-2 (p. 3); dated 2020.

(Continued)

*Primary Examiner* — Victor L MacArthur

(74) *Attorney, Agent, or Firm* — Faegre Drinker Biddle & Reath LLP

(57)          ABSTRACT

A positive drive differential assembly including a differential with an input pinion configured to operably engage with a drive shaft so as to permit the drive shaft to rotate the pinion. A bi-directional overrunning clutch assembly is configured to transmit torque between the pinion and two drive axle segments. A pinion disconnect assembly is provided for controlling transmission of rotation to the pinion and including a rotary coupler. A linear actuator is connected to the rotary coupler and configured to translate the rotary coupler between connected and disconnected positions.

21 Claims, 13 Drawing Sheets

(56)  References Cited

U.S. PATENT DOCUMENTS

| | | | |
|---|---|---|---|
| 6,722,484 B2 | 4/2004 | Ochab et al. | |
| 7,018,317 B2 | 3/2006 | Tweet et al. | |
| 7,207,409 B2 | 4/2007 | Downs | |
| 8,316,981 B2 | 11/2012 | Nyberg et al. | |
| 8,919,513 B2 | 12/2014 | Heath et al. | |
| 9,022,195 B2 | 5/2015 | Heath et al. | |
| 9,856,930 B2 | 1/2018 | Heath et al. | |
| 11,124,054 B1 | 9/2021 | Hadad et al. | |
| 11,131,350 B1 | 9/2021 | Palmer | |
| 11,236,811 B1 | 2/2022 | Hasson, Jr. et al. | |
| 11,421,769 B2 | 8/2022 | Heath et al. | |
| 12,496,902 B2 * | 12/2025 | Heath | B60K 23/0808 |
| 2007/0010366 A1 | 1/2007 | Arin | |
| 2020/0263775 A1 | 8/2020 | Murphy et al. | |
| 2022/0381328 A1 | 12/2022 | Hamrin et al. | |

OTHER PUBLICATIONS

Partial European Search Report for corresponding EP 24150679.9 dated Mar. 6, 2024, 18 pages.
Extended European Search Report for corresponding EP 24150679.9 Application; dated Jul. 8, 2024, 19 pages.

* cited by examiner

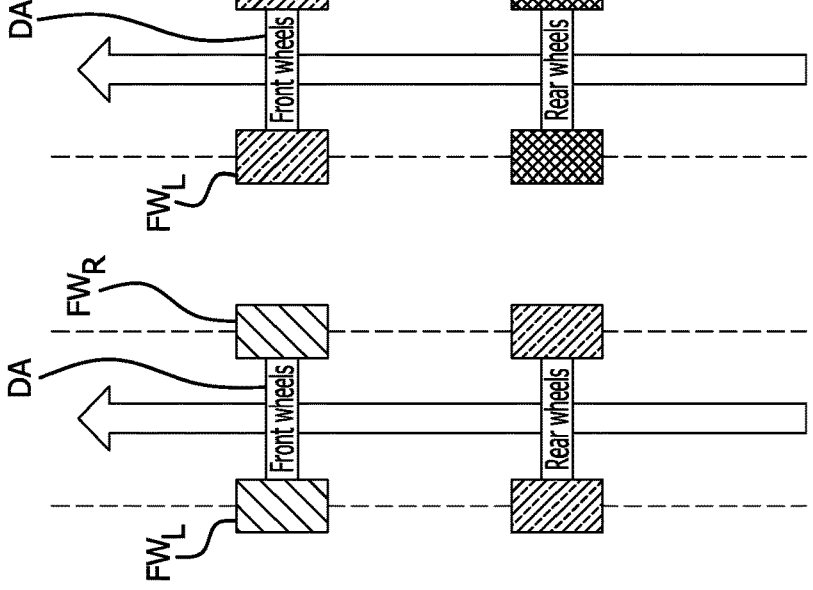

Driving in a straight path
Minor loss of traction to both rear wheels
- Operator is pressing on the accelerator pedal
- Driving the vehicle forward

| | |
|---|---|
| ⟋⟋ | No power to the wheel |
| ⟋⟋ | Power to the wheel and ground |
| ⊠ | Power to the wheel with minor loss of traction to ground |

Driving in a straight path
Full traction to both rear wheels
- Operator is pressing on the accelerator pedal
- Driving the vehicle forward

FIG. 7B       FIG. 7A

POSITIVE DRIVE DIFFERENTIAL

RELATED APPLICATION

This application is a continuation of and claims priority to U.S. application Ser. No. 18/166,096 filed Feb. 8, 2023, the disclosure of which is incorporated herein by reference in its entirety.

FIELD OF THE INVENTION

The present disclosure relates to a differential for a four wheel drive system and, more specifically, to a positive drive differential operably controlling power transmission through the differential.

BACKGROUND

There have been many developments in recent years in drive systems for four wheel drive and all-wheel drive vehicles. Many of the developments have been directed to increasing or maintaining torque on all the wheels. In a basic drive system, a drive shaft is connected to a drive axle which drives two wheels, one at each end of the axle. Because the wheels are on a common drive axle, they rotate at the same rate. A problem occurs when the vehicle enters into a turn. During a turn, the outer wheel travels a greater distance than the inner wheel in the same amount of time. As such, the outer wheel must rotate faster than the inner wheel during the turn. This requires differential rotation. When the outer and inner wheels are fixed to a common axle, however, differential rotation is not permitted. The result is that either the inner wheel is driven faster or the outer wheel is driven slower than is optimum for the speed of the vehicle. In either case, cornering the equipment requires one of the wheels to slip or skid. That results in premature wear of the wheel.

To address this issue, drive systems generally include a differential between the pair of drive wheels. The differential permits independent or differential rotation of the drive wheels on an axle when the user corners. Many drive systems with differentials use some form of an overrunning clutch to transmit torque when needed to a driven shaft, while allowing a wheel to turn faster than the motor drive when necessary.

Commonly assigned U.S. Pat. No. 6,722,484 describes a bi-directional overrunning clutch that allows the motor to drive both wheels in either direction when proceeding in a straight line, and on corners allows the power to be directed to drive the slower (inside) wheel, while allowing the outside wheel to turn faster, without the need for a complex differential. U.S. Pat. No. 6,722,484 is incorporated herein by reference in its entirety. The clutch disclosed in U.S. Pat. No. 6,722,484 has proven very satisfactory. However, there is still room for further improvement.

Commonly assigned U.S. Pat. No. 9,856,930 describes a bi-directional overrunning clutch differential for use with a drive axle which incorporates an outer spring to urge rolls of the bi-directional overrunning clutch into engagement with recesses formed on hubs connected or connectible to the drive axles. While this arrangement provides a significant leap forward in a positive drive bi-directional overrunning clutch differential, additional improvements would be beneficial.

At times it becomes necessary or desirable to disconnect a rotary motion from being transmitted to a differential on a secondary drive axle. In recent years disconnect devices have been incorporated into transaxles for connecting and disconnecting a drive shaft. For example, the Can Am Maverick Max Turbo Gearbox includes a disconnect device for disconnecting the drive shaft. See, https://www.canam-partshouse.com/oemparts/a/cam/62a7a6e380771a918f440d4b/gear-box-and-components. However, that disconnect is not associated with the differential on a secondary drive axle.

A need exists for an improved differential for a secondary drive axle which provides positive drive.

SUMMARY OF THE INVENTION

In an embodiment, the present invention is directed to a positive drive differential that includes a differential housing with an input pinion. The input pinion has a pinion gear and a pinion input shaft attached to the pinion gear, the pinion gear located within the differential housing and the pinion input shaft extends out of an opening in the differential housing. The pinion input shaft is configured to operably engage with a drive shaft so as to permit the drive shaft to rotate the pinion shaft.

A bi-directional overrunning clutch assembly is located within the differential housing and configured to engage with at least one drive axle segment. The bi-directional overrunning clutch assembly is configured, when engaged, to transmit torque between the pinion gear and the drive axle segments. The bi-directional overrunning clutch assembly includes a ring gear engaged to the pinion gear. A clutch housing is attached to or formed integral with the ring gear with the ring gear positioned radially outward from an inner surface of the clutch housing. The inner surface has a contoured surface formed on at least a portion of the inner surface. Two roller clutch assemblies are located radially inward from the inner surface of the clutch housing. Each roller clutch assembly includes a roll cage with a plurality of spaced apart slots that extend radially through the roll cage from its outer surface to its inner surface. A roll is located in each slot and sized so that it can rotate within the slot. At least one spring biases each roll against movement radially outward relative to the slot. A roll cage coupler is positioned between the two roll assemblies for intermittently coupling the two roll cages to limit relative motion of the roll cages with respect to one another. The roll cage coupler is configured to engage with each roll cage.

Two hubs are located radially inward of the roller clutch assembly. The hubs are axially aligned with one another so as to rotate about a common axis. Each hub is configured to engage with an end of a corresponding drive axle segment. Each hub is located radially inward from a plurality of the rolls. Each hub has a contoured exterior portion with a plurality of recessed channels formed on the contoured exterior portion of the hub. The recessed channels each extend axially along the contoured exterior portion parallel to a longitudinal axis of the hub. The recessed channels are each sized so that a portion of a roll can seat within the channel. The recessed channels are spaced about the circumference of the contoured exterior portion of the hub.

The spring biases each of the rolls in its roller clutch assembly into one of the recessed channels of the corresponding hub when the rolls are not overrunning. The seating of the rolls in the recessed channels provides a connection between the associated roll cage and hub so as to cause the roll cage to initially move with its associated hub.

The positive drive differential assembly optionally includes a pinion bearing located between a portion of the input pinion and the differential housing for permitting the input pinion to rotate with respect to the differential housing.

In an embodiment, the pinion shaft includes a splined end located outside of the differential housing which is configured to engaged with a mating splined connection on an end of the drive shaft.

The ring gear is preferably formed integral with, circumscribes and extends radially outward from an outer periphery of the clutch housing.

In one embodiment the slots in each roll cage extend axially to one edge of the roll cage so as to provide a lateral opening into the slot from an axial end of the roll cage.

In an embodiment, the at least one spring is a single spring per roll cage which biases all the rolls in its roll cage assembly radially inward so as to cause the rolls to engage with the recessed channels in its associated hub.

Preferably the inner contoured surface of the clutch housing includes a plurality of peaks and valleys, the number of valleys is at least equal in number to the number of rolls, wherein when no load is applied to the bidirectional overrunning clutch, each roll is located within one of the valleys with the contoured surface tapering inward toward the roll cage on either side of the rolls.

In an embodiment, the number of recessed channels in each hub is a multiple of the number of rolls in its associated roller cutch assembly so that, in a resting position, all of the rolls are seated in respective ones of the recessed channels.

In an embodiment, each of the hubs includes an axially outer end with an outer surface that is reduced in diameter with respect to the contoured exterior portion. A portion of the axial outer end of one of the hubs extends through a central opening in the cover and a portion of the axial outer end of the other hub extends through a central opening of main housing.

Preferably an axially inward end of one hub has a reduced diameter portion that fits within a recess in an axially inward end of the other hub.

In an embodiment, the roll cage coupler includes a center ring with a plurality of teeth extending radially outward from the ring. The number of teeth is the same as or less than the number of slots. Each tooth fits into one of the open ends of one of the slots in each of the roll cages, and each tooth has a circumferential width that is less than a width of the open end of the slot.

The roll cage coupler may include a center ring with a plurality of teeth extending radially outward from the ring. Each tooth fits into a receptacle in at least one of the roll cages, and each tooth has a circumferential width that is less than a width of its associated receptacle. Preferably the receptacle is one of the slots in the roll cage.

In an embodiment, the roll cage coupler has a plurality of teeth extending axially outward from at least one of the roll cages. Each tooth fits into a receptacle in the other roll cage, and each tooth has a circumferential width that is less than a width of its associated receptacle.

In an embodiment, the positive drive differential assembly is part of a four wheel drive vehicle. The four wheel drive vehicle has a primary drive axle and a secondary drive axle. The positive drive differential assembly is operably coupled to the secondary drive axle. Preferably there is a second positive drive differential assembly that is operably coupled to the primary drive axle.

In an embodiment, a support is provided between each hub and the differential housing.

In an embodiment, a differential assembly for a four wheel drive vehicle is disclosed. The four wheel drive vehicle has a primary drive axle and a secondary drive axle.

The secondary drive axle has two drive axle segments. The differential assembly is configured to operably couple to the secondary drive axle.

The differential assembly includes a differential housing. An input pinion with a pinion gear and a pinion input shaft attached to the pinion gear. The pinion gear is located within the differential housing and the pinion input shaft extends out of an opening in the differential housing. The pinion input shaft is configured to operably engage with a drive shaft so as to permit the drive shaft to rotate the pinion shaft.

A bi-directional overrunning clutch assembly is located within the differential housing and is configured to engage with the two drive axle segments. The bi-directional overrunning clutch assembly is to transmit torque, when engaged, between the pinion gear and the drive axle segments. The bi-directional overrunning clutch assembly includes a ring gear engaged to the pinion gear. A clutch housing attached to or formed integral with the ring gear with the ring gear positioned radially outward from an inner surface of the clutch housing. The inner surface having a contoured surface formed on at least a portion of the inner surface. Two roller clutch assemblies are located radially inward from the inner surface of the clutch housing. Each roller clutch assembly includes a roll cage with a plurality of spaced apart slots that extend radially through the roll cage from its outer surface to its inner surface. A roll is located in each slot and sized so that it can rotate within the slot. At least one spring biases each roll against movement radially outward relative to the slot. A roll cage coupler is positioned between the two roll assemblies for intermittently coupling the two roll cages to limit relative motion of the roll cages with respect to one another. The roll cage coupler is configured to engage with each roll cage.

Two hubs are located radially inward of the roller clutch assembly. The hubs are axially aligned with one another so as to rotate about a common axis. Each hub is configured to engage with an end of a corresponding drive axle segment and it located radially inward from a plurality of the rolls. Each hub has a contoured exterior portion with a plurality of recessed channels formed on the contoured exterior portion of the hub. The recessed channels each extend axially along the contoured exterior portion parallel to a longitudinal axis of the hub. The recessed channels are each sized so that a portion of a roll can seat within the channel. The recessed channels are spaced about the circumference of the contoured exterior portion of the hub.

The at least one spring biases each of the rolls in its associated roller clutch assembly into one of the recessed channels when the rolls are not overrunning. The seating of the rolls in the recessed channels provides a connection between the associated roll cage and hub so as to cause the roll cage to initially move with its associated hub.

In an embodiment, a four wheel drive vehicle is disclosed that includes a motor operably coupled to a transmission. The transmission is configured to transmit power from the engine to primary and secondary drive shafts. The primary drive shaft has a first end operably connected to the transmission for receiving rotary motion from the transmission, and a second end connected to a primary differential. A primary drive axle includes two primary drive axle segments, each primary drive segment has one end connected to a ground engaging wheel and the opposite end operably connected to the primary differential. The primary differential is configured to transmit rotary motion from the primary drive shaft to the primary drive axle. The secondary drive shaft has a first end operably connected to the transmission for receiving rotary motion from the transmission, and a second end connected to the pinion input shaft of any of the positive drive differential assemblies herein.

In another embodiment, a four wheel drive vehicle Is disclosed that includes a motor operably coupled to a transmission. The transmission is configured to transmit power from the engine to primary and secondary drive shafts. Two positive drive differential assemblies are provided according to any of the positive drive differential assemblies disclosed herein. The primary drive shaft has a first end operably connected to the transmission for receiving rotary motion from the transmission, and a second end connected to the pinion input shaft of one of the positive drive differential assemblies. The secondary drive shaft has a first end operably connected to the transmission for receiving rotary motion from the transmission, and a second end connected to the pinion input shaft of the other positive drive differential assembly.

The foregoing and other features of the invention and advantages of the present invention will become more apparent in light of the following detailed description of the preferred embodiments, as illustrated in the accompanying figures. As will be realized, the invention is capable of modifications in various respects, all without departing from the invention. Accordingly, the drawings and the description are to be regarded as illustrative in nature, and not as restrictive.

BRIEF DESCRIPTION OF THE DRAWINGS

For the purpose of illustrating the invention, the drawings show a form of the invention which is presently preferred. However, it should be understood that this invention is not limited to the precise arrangements and instrumentalities shown in the drawings

FIG. 4A is the disengaged or neutral position; FIG. 4B is the forward engagement position; and FIG. 4C is the backward engagement or backdriving position.

FIG. 7A is a schematic representation of a four wheel drive vehicle according to the present invention with the vehicle driving straight with both rear wheels providing traction. FIG. 7B illustrates the vehicle when the rear wheels lose traction and the front wheels provide traction.

DETAILED DESCRIPTION OF THE EMBODIMENTS

Figures 1, 1A, 2:
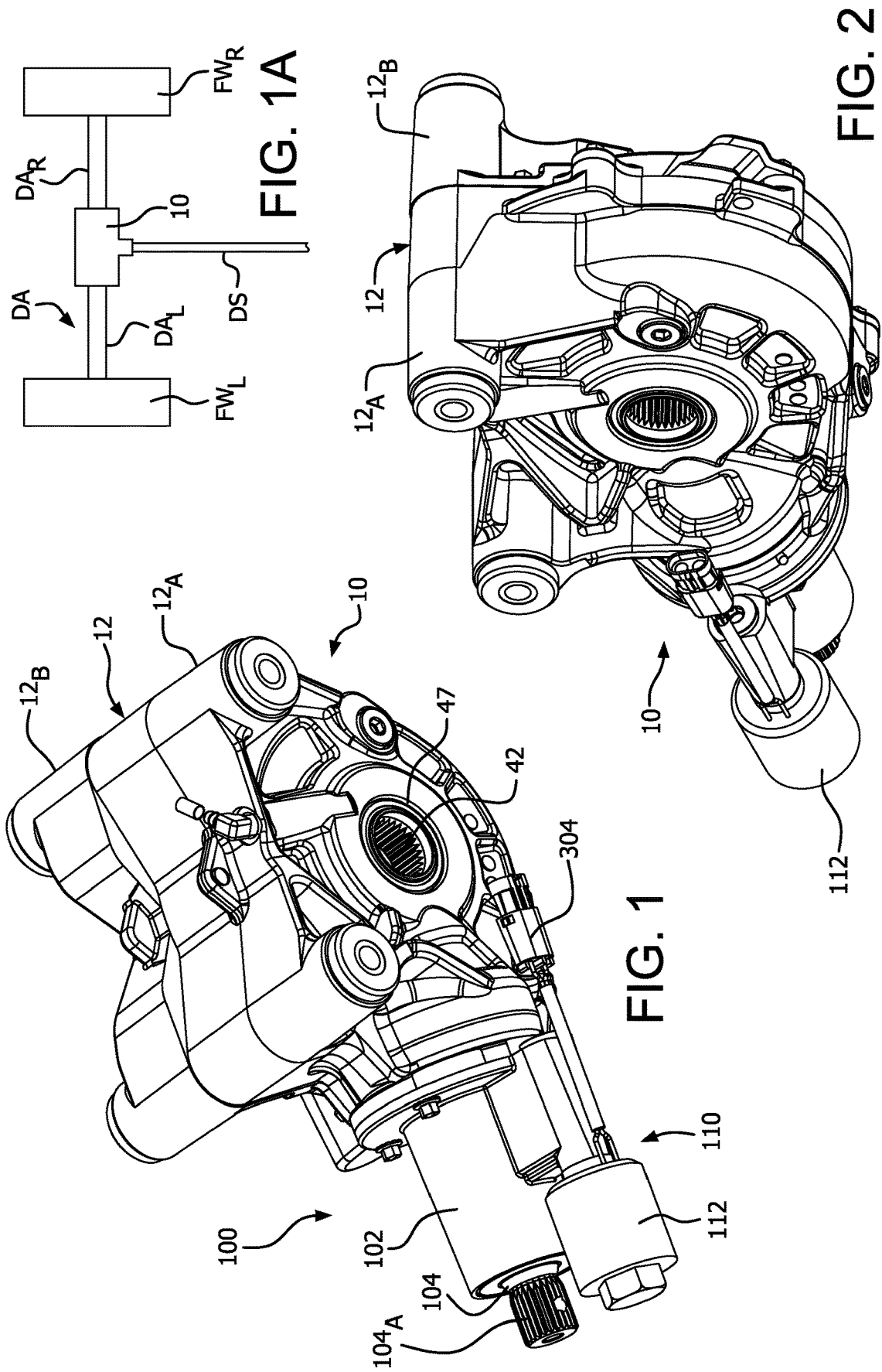
FIG. 1 is a top perspective view of a positive drive differential assembly according to the present invention.
FIG. 1A is a schematic view of part of a drive system for a four wheel drive vehicle in accordance with the present invention illustrating the secondary drive axle and wheels.
FIG. 2 is a bottom perspective view of the positive drive differential assembly of FIG. 1.
Figure 3:
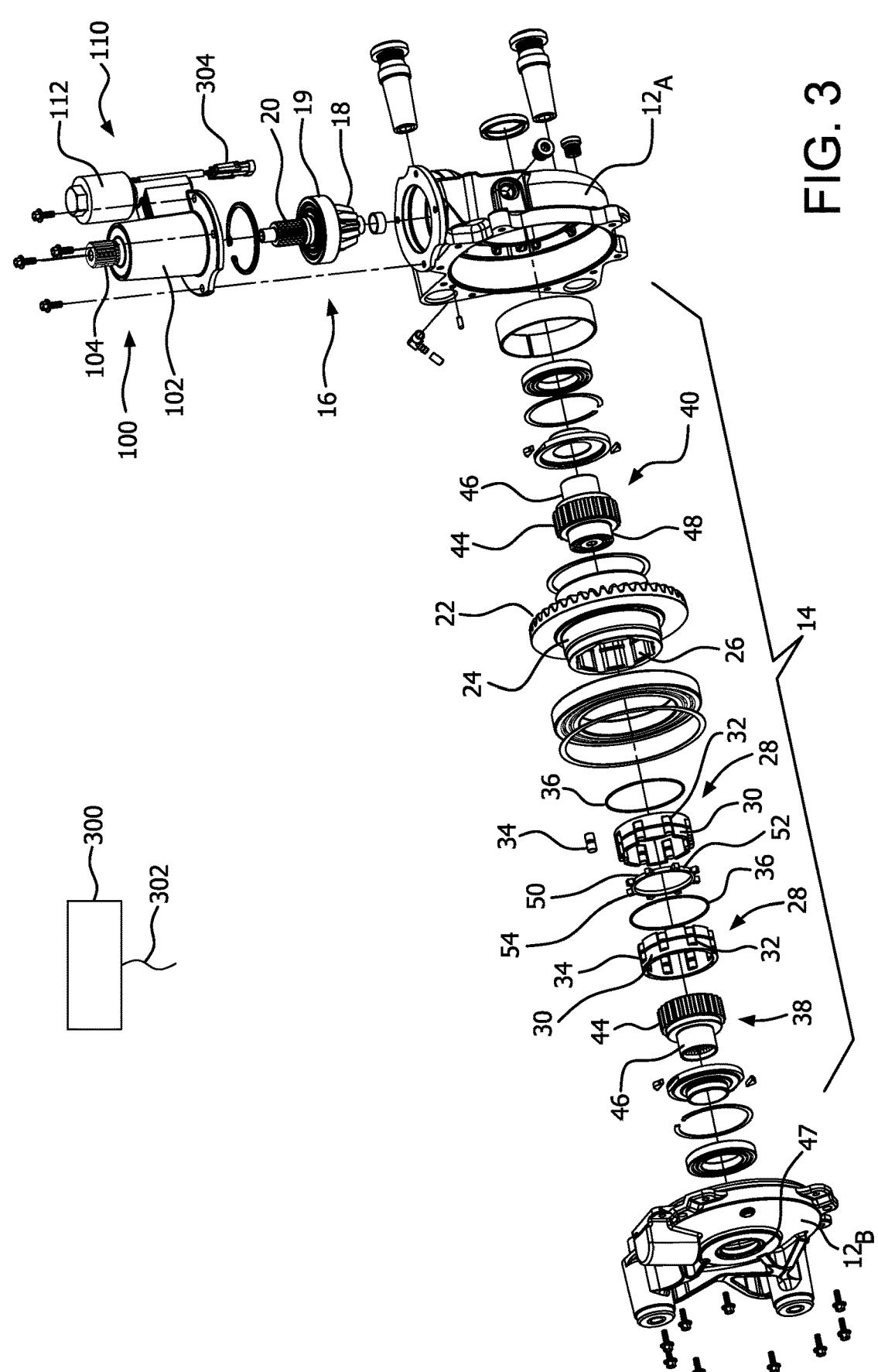
FIG. 3 is an exploded view of the differential assembly of FIG. 1.

Referring now to the drawings, wherein like reference numerals illustrate corresponding or similar elements throughout the several views, FIGS. 1-3 illustrate a positive drive differential 10 for use on for engaging with a front drive axle DA (FIG. 1A) on a four wheel drive vehicle. While the drawings and following description describe the invention as part of or in conjunction with the front differential of a front (secondary) drive axle in a four wheel drive vehicle, it could be used on or in conjunction with a rear differential if the rear differential is not part of the primary drive axle (i.e., a front wheel drive vehicle). The positive drive differential includes a differential housing 12 that, in the illustrated embodiment, includes a main housing 12$_A$ and a removable cover 12B. A bi-directional overrunning clutch assembly 14 is located within the differential housing 12. As will be described in greater detail, the construction of the clutch 14 facilitates turning of the vehicle by allowing an outer wheel and its associated shaft segment to rotate faster than the inner wheel and its associated shaft segment, which remain positively driven by the motor through the clutch 14. Thus, the clutch 14 permits the outer wheel to independently rotate while the inner wheel continues to be driven by the motor.

An input pinion 16 (FIG. 3) is located within the differential housing 12. The input pinion includes a pinion gear 18 and a pinion input shaft 20 attached to the pinion gear. The pinion gear is located within the differential housing 12 and the pinion input shaft 20 extends out of an opening in the differential housing 12. A bearing 19 preferably is located between a portion of the input pinion 16 and the differential housing 12 so as to permit the input pinion to rotate with respect to the differential housing. A drive shaft DS (FIG.

1A) attaches to the pinion input shaft 20 of the pinion 16 so as to transmit rotation from the drive shaft DS to the pinion 16 which, in turn, transmits rotation and torque to the bi-directional overrunning clutch assembly 14. The connection between the drive shaft DS and the pinion input shaft 20 can be through any conventional means, but in the illustrated embodiment is a splined connection. The bi-directional overrunning clutch assembly 14 is engaged with two independent drive axle segments $DA_L$, $DA_R$ of the drive axle DA for transmitting torque from the bi-directional overrunning clutch assembly 14 to front left and front right wheels $FW_L$, $FW_R$, respectively, as discussed in more detail below.

Referring to FIG. 3, an exploded view of the differential 10 is shown. The pinion gear 18 is positioned within the housing 12 so as to engage with a ring gear 22 in a conventional manner. The ring gear 22 is part of or attached to the bi-directional overrunning clutch assembly 14. In the illustrated embodiment, the ring gear 22 is attached to or formed integral with a clutch housing 24. More specifically, the ring gear 22 in one embodiment circumscribes and extends radially outward from an outer periphery of the clutch housing 24. As such, as the pinion 16 rotates, the pinion gear 18 rotates the ring gear 22 which, in turn, rotates the clutch housing 24. The clutch housing 24 include an inner surface 26 that has a cam profile/contoured surface around a portion of its inner periphery. The contoured surface is discussed in greater detail below.

The clutch assembly 14 preferably includes a pair of roller assemblies 28 each having a roll cage 30 formed in the shape of a ring with a plurality of spaced apart slots 32 that extend radially through the roll cage 30 from its outer surface to its inner surface. The slots 32 preferably extend axially to one edge of the roll cage 30 so as to provide a lateral opening into the slot 32 from an axial end of the roll cage 30. Each roller assembly 28 include a plurality of rolls 34, one roll located in each slot. The rolls 34 are sized so that each roll can rotate within a corresponding slot 32. In the illustrated embodiment there are eight rolls 34 in each roller assembly. However, the number of rolls 34 can vary depending on many factors, including the size of the differential and the anticipated torque that will be transmitted.

Each roller assembly 28 includes one or more springs 36 that contact the rolls 34 and bias the rolls against radial movement out of the slots 32. The spring 36 biases the rolls toward or into the recessed channels 44. As will become apparent below, the biasing assists the roll cage with indexing when a hub is overrunning or underrunning while in a turn. The spring biases the rolls so that they remain seated in the recessed channels 44 when the hub indexes to the $26_T$. As will be discussed in more detail herein, the spring 36 maintain the rolls 34 in contact with an outer surface of hubs that are connected to the drive axle segments $DA_L$, $DA_R$. In the illustrated embodiment, there is one spring 36 extending around the periphery of the roll cage 30. The spring is preferably a garter spring although other springs can be used. To help maintain alignment of the rolls 34 in the slots 32, each roll preferably has an annual groove formed in its periphery in which the spring 36 seats.

Two hubs 38, 40 are located radially inward of the roller clutch assemblies 28. The hubs are axially aligned with one another so as to rotate about a common axis. More specifically, one hub is located radially inward from each roller assembly 28. Each hub preferably has a hole in one end of the hub with splines 42 (FIG. 1) formed on an inner surface of the hole, the hole configured to receive a splined end of one of the corresponding drive axle segments $DA_L$, $DA_R$. Of course, the hub may instead include a stub shaft portion with outer splines for engaging with inner splines on a shaft segment. Other types of well-known connections can be substituted for the illustrated splines. The splined connections secure the hubs 38, 40 to the drive axle segments $DA_L$, $DA_R$ such that each hub 38, 40 rotates in combination with its associated drive axle segment $DA_L$, $DA_R$. A support is provided between each hub and the differential housing. The support helps maintain the alignment of the hubs while permitting each hub to rotate relative to the differential housing. In one embodiment, the support is provided by end caps or bearing in the main housing $12_A$ and a removable cover $12_B$.

Figures 4A, 4B, 4C:
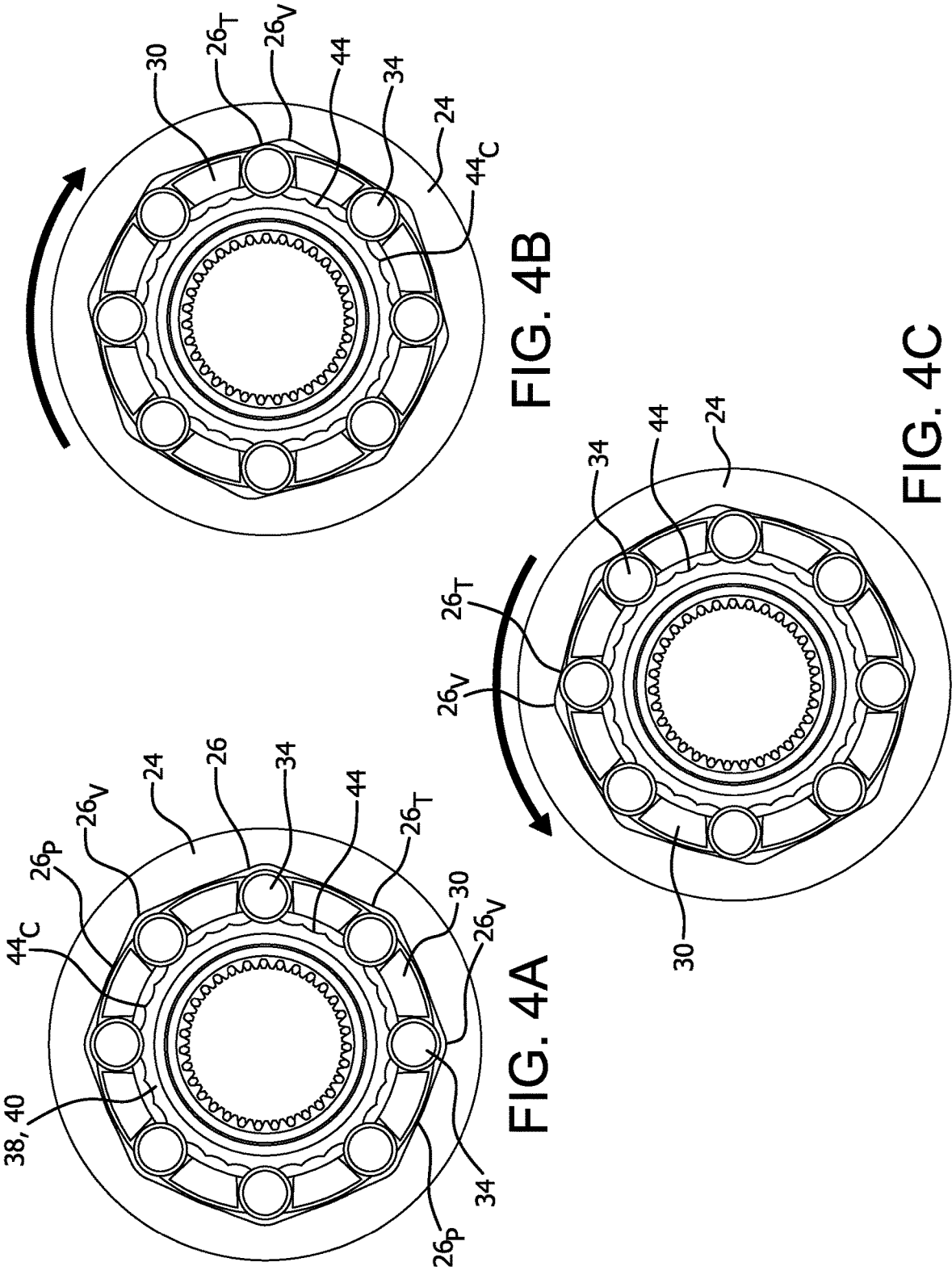
FIGS. 4A-4C illustrate different positions or stages of the overrunning clutch.

As shown in FIG. 4A, each of the hubs 38, 40 has a contoured or scalloped exterior surface with a series of semicylindrical or curved recessed channels 44 that extend parallel to the axis of the hub. The recessed channels 44 are dimensioned to receive or provide a seat for a portion of each of the rolls 34 so that the rolls 34 can rotate within the recessed channels and spaced equidistant from one another circumferentially about the exterior surface. Thus, the radius of curvature of the recessed channels 44 is the same or slightly larger than the radius of the rolls. The number of recessed channels 44 in each hub 38, 40 is a multiple of the number of rolls 34 in each set so that, in a resting position, all of the rolls 34 are seated in respective ones of the recessed channels 44.

As shown in FIG. 3, each of the hubs 38, 40 includes an axially outer end 46 with an outer surface that is preferably reduced in diameter with respect to the scalloped portion. The reduced diameter portion 46 is preferably sized to extend into or through a central opening 47 in the cover $12_B$ and main housing $12_A$ so as to permit the ends of the drive axle segments to be connected. The axially inward end 48 of one hub 40 preferably has a reduced diameter portion that fits within a recess in the axially inward end of the other hub 38, but permits the hubs to rotate relative to one another. The cover $12_B$ is fastened to the main housing $12_A$ to form the differential housing 12, which may contain grease or other lubricant and may be sealed by O-rings or similar components between the hubs 38, 40 and the different housing 12.

When the vehicle is stationary, i.e., the drive shaft is not rotating the pinion 16 and, thus, no torque is being applied to the differential 10, each roll 34 sits within a recessed channel 44 in its corresponding hub 38, 40. As discussed above the clutch housing 24 has a contoured inner surface 26. More specifically, the contoured inner surface 26 includes a plurality of peaks $26_P$ and valleys $26_V$. The number of valleys $26_V$ is at least equal in number to the number of rolls 34 in each set. In the resting position shown in FIG. 4A, the rolls 34 are located within the valleys $26_V$ with the contoured surface 26 tapering inward toward the roll cage 30 on either side of the rolls 34 (generally referred to herein as tapered portions $26_T$). The valleys $26_V$ are sufficiently deep such that when a roll 34 is in the middle of a valley $26_V$ the roll 34 preferably does not touch the contoured surface 26 and can move radially outwards far enough to pass over a cusp $44_C$ between adjacent recessed channels 44 in the scalloped surface. The peaks $26_P$ are sufficiently close to the roll cage 30 such that when the rolls 34 are fully seated in recessed channels 44 in the scalloped surface, the rolls cannot pass under the peaks $26_P$ but, instead, wedge on the tapered portions $26_T$.

For ease of manufacture and assembly, the contoured surface 26 preferably has n-fold rotational symmetry about the main axis of the clutch, where there are "n" rolls 34 in each roll cage, and preferably has mirror symmetry about any plane including the axis passing through the center of a peak $26_P$ or valley $26_V$, and the roll cages 30 and hubs 38, 40 also have the same symmetry. The clutch can then be assembled without requiring any specific alignment of the components. However, since the roll cages 30 cannot rotate relative to the clutch housing more than the width of one valley the level of symmetry is not essential, and may be departed from for other reasons. In the illustrated embodiment there are eight rolls 34 in each roller assembly 28. Any desirable number of rolls and corresponding valleys may be used as required by the anticipated torque.

The contoured surface 26 of the clutch housing and the roller assemblies 28 provide the bi-directional overrunning capabilities as will be discussed hereinafter. Contoured surfaces and roll cages in overrunning clutches are well known in the art. See, e.g., above-mentioned U.S. Pat. Nos. 6,722,484 and 5,971,123. A further detailed discussion of the features of a contoured surface is, therefore, not needed.

In the neutral or resting position shown in FIGS. 4A and 7A, the hubs 38, 40 are not engaged to the clutch housing 24 because the rolls 34 are not wedged between the clutch housing 24 and the hubs 38, 40. However, because the spring 36 biases the rolls into the recessed channels 44 of the scalloped surfaces of the hubs 38, 40, the roll cages 30 are connected to the hubs 38, 40 causing each roll cage 30 to initially move with its respective hub 38, 40. As a result, any relative motion between the clutch housing 24 and the hubs 38, 40 will cause the respective roll cage 30 to index or position the rolls 34 for engagement. Hence, although the resting position of the rolls shown in FIG. 4A theoretically provides no direct torque transfer between the pinion gear 18 and the hubs, in reality, positive drive occurs essentially instantaneously upon any relative movement between the clutch housing and the hubs. For example, in the embodiment illustrated, engagement occurs with very little rear wheel slip which causes relative rotation between the clutch housing and hubs.

Referring to FIG. 4B, as torque is applied, i.e., the clutch housing moves relative to the roll cage, the roller assembly 28 transitions into its forward-engagement position. When the drive system of the vehicle is engaged for forwardly driving the vehicle, the motor causes the clutch housing 24 to rotate with respect to the hubs 38, 40 in the direction of the arrow in FIG. 4B. Because the hubs 38, 40 are engaged to the wheels $FW_L$, $FW_R$ through the drive axle segments $DA_L$, $DA_R$, the hubs initially do not move. Since the roll cages 30 are connected to the hubs by the rolls 34 that are held in place by the spring 36, the roll cages 30 and the rolls 34 also remain stationary. As a result, the rolls 34 wedge between the tapered portions $26_T$ and the hubs 38, 40. The wedging of the rolls 34 provides a path for the transmission of torque from the input pinion gear 18 through the rolls 34 to the hubs 38, 40, and thus to the drive axle DA. See, FIGS. 7B, 8, 8A and 8B. This represents the forward-engagement position of the bi-directional clutch which permits the motor-driven rotation of the hub 38, 40 and the associated drive axle segments $DA_L$, $DA_R$ and the wheels $FW_L$, $FW_R$. The opposite motion happens in the reverse direction, for example when the vehicle is in reverse (reverse-engagement or backdriving position). See, FIG. 4C.

The above-described construction of the bi-directional clutch assembly 14 also allows the drive axle segments $DA_L$, $DA_R$ (and, thus, the wheels $FW_L$, $FW_R$) to overrun (disengage) from the forward-engagement position. This is particularly important during turning (FIG. 9A) where it is beneficial to permit one wheel (i.e., the outer wheel) to turn faster than the other wheel (i.e., the inner wheel), while the motor continues to drive the slower wheel, and thus to propel the vehicle. This prevents scuffing and resultant wear of the slower moving wheel. More importantly, the overrunning greatly reduces the effort required to steer the vehicle. The present invention achieves this goal in the drive axle segments $DA_L$, $DA_R$ by allowing each hub 38, 40 to overrun separately, i.e., to rotate independent from the clutch housing 24, when the applicable hub 38, 40 rotates faster than the clutch housing 24. Bi-directional overrunning clutches are well known and are described in U.S. Pat. Nos. 5,971,123, 6,722,484 and 9,856,930, which are incorporated herein by reference in their entireties. As such, no further discussion is necessary.

As discussed above the bi-directional overrunning clutch assembly 14 includes two separate roller assemblies 28, each having a set of rolls 34 associated with a corresponding drive axle segment. This allows overrunning of one drive axle segment while maintaining positive driving engagement of the other drive axle segment. For example, as mentioned above and shown in FIG. 9A, when a vehicle travels around a curve, the wheel on the inside of the curve has a shorter distance to travel and, thus, travels at a slower speed, than the wheel on the outside of the curve. Consequently, the drive axle segment, for example $DA_L$, associated with the inside wheel, for example $FW_L$, will continue to be driven, with its respective rolls 34 engaged between the outer surface 44 of the hub 38 and the forward contour surfaces of the inner surface 26 of the housing 24. Meanwhile the other hub, for example hub 40, associated with the outside wheel, for example $FW_R$, is allowed to overrun, turning faster than the housing 24, such that its respective rolls 34 will disengage from wedging between the inner contour surface 26 and the outer surface 44 of the hub 40, thus allowing the hub 40 to freely rotate as it is driven by the outer wheel $FW_R$. See, FIGS. 10, 10A and 10B. When the vehicle returns to a straight path and the speed of the disengaged hub 40 slows down to equal the speed of the housing 24, the rolls 34 surrounding the hub 40 re-engage (wedge) between the forward contour surface 26 and hub 40 so that the hub 40 is once again driven to rotate at the same speed as the housing 24.

As shown, the roller assemblies 28 are not directly connected to one another. As such, the assemblies 28 can rotate relative to one another, which is necessary for the independent overrunning of the drive axle segments discussed above. However, if the two roll cage assemblies 28 are completely decoupled, there is the potential that the rolls 34 associated with the overrunning hub 40 could go into reverse engagement with the reverse tapered portions $26_T$ of the contoured surface 26 of the housing 24, thereby causing the vehicle to act as if it has a solid axle (i.e., one axle being driven by the housing 24, while the other axle tries to drive the housing 24). In addition, if the inner front wheel loses traction during a turn, neither front wheel will have driving traction with the ground.

Figure 8:
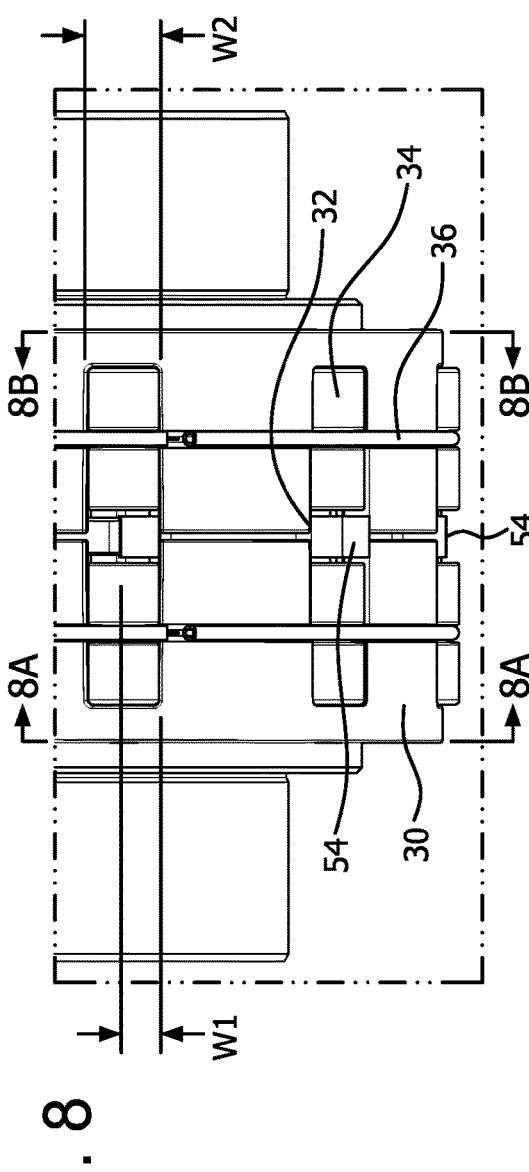
FIG. 8 is a schematic view of a portion of the overrunning clutch in the differential assembly of FIG. 1 when the vehicle is driving as shown in FIG. 7B with slippage of the rear wheels.
Figure 8B:
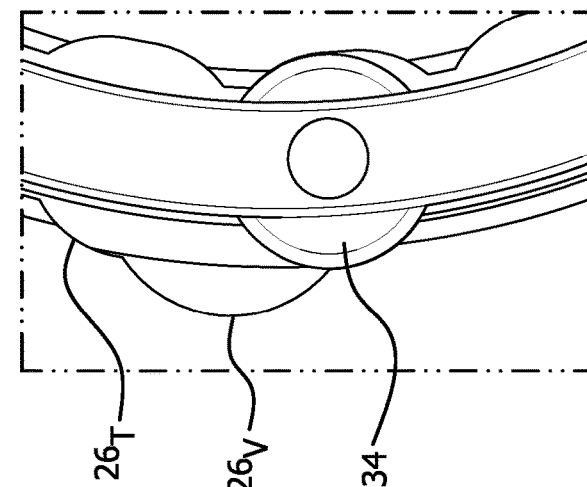
FIG. 8B is a side view taken along lines 8B-8B in FIG. 8 illustrating a roll relative to the clutch housing, the other hub and its associated roll cage showing the forward engagement position.
Figure 8A:
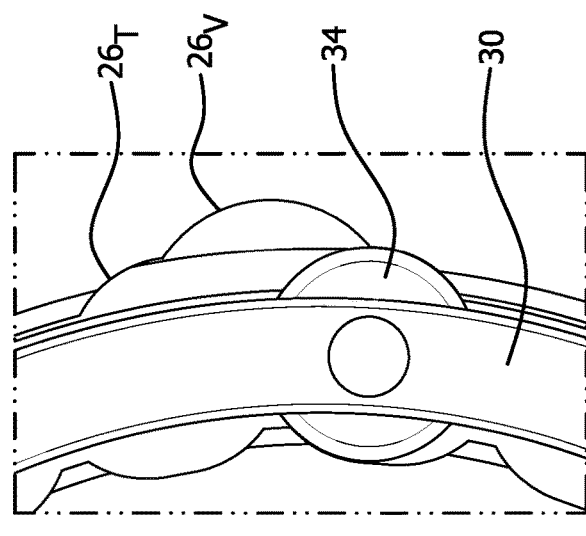
FIG. 8A is a side view taken along lines 8A-8A in FIG. 8 illustrating a roll relative to the clutch housing, one of the hubs and its associated roll cage showing the forward engagement position.

To overcome potential reverse engagement of an overrunning hub 40, as well as provide power to the outer wheel in a turn during inner wheel traction loss, the clutch assembly 14 includes a roll cage coupler 50 which, in one embodiment, is positioned between the two roll assemblies 28, as shown in FIG. 3. In this embodiment, the coupler 50 includes a center ring 52 with a plurality of teeth 54 extending radially outward from the ring 52. The number of teeth 54 preferably matches the number of slots 32 and the number of rolls 34 in each roll cage 30, although a lesser number of teeth could be used. The teeth 54 of the coupler 50 preferably fit into the open ends of the slots 32 in each roll cage 30. As shown in FIG. 8, the width W1 of the circumferential portion of each tooth 54 is slightly less than the width W2 of the slot 32 such that a gap exists. This gap is designed to permit a roll cage 30 to shift or index as discussed herein so that the rolls 34 are positioned to engage with the tapered portions 26$_T$ of the contoured surface 26, but the gap is not large enough to permit the other roll cage 30 to index in the opposite direction to cause the reverse wedging discussed above. Accordingly, by using an intermittent coupler 50, the present invention prevents the issue of one set of rolls engaging the forward tapered portions 26$_T$ to drive one axle and the other set of rolls engaging the reverse tapered portions 26$_T$ to be driven by the other axle. It is also contemplated that the roll cage coupler 14 could be defined by features formed on or attached to either or both of the roll cages. For example, a plurality of teeth of the roll cage coupler could extend axially outward from an end of at least one of the roll cages with each tooth fitting into a receptacle in the face of the other roll cage. As discussed above, each tooth has a circumferential width that is less than a width of its associated receptacle.

Figure 10:
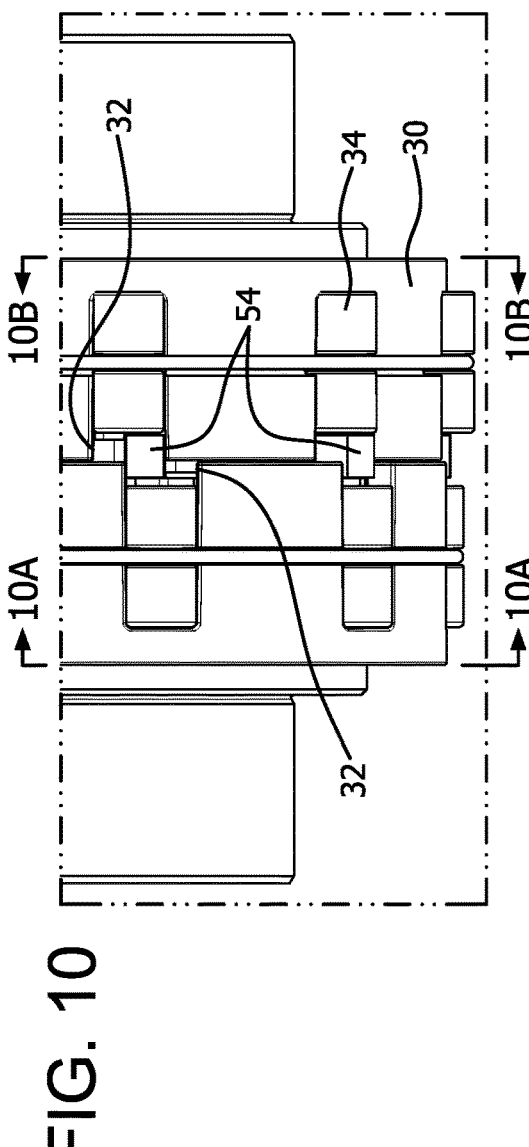
FIG. 10 is a schematic view of a portion of the overrunning clutch in the differential assembly of FIG. 1 when the vehicle is driving as shown in FIG. 9A with the rear wheels and the inner front wheel providing traction.
Figure 10B:
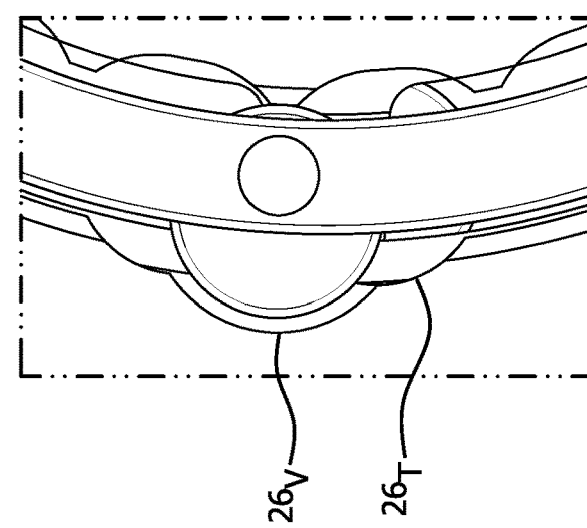
FIG. 10B is a side view taken along lines 10B-10B in FIG. 10 illustrating a roll relative to the clutch housing, the hub of the outer front wheel and its associated roll cage showing the roll in the neutral position.
Figure 10A:
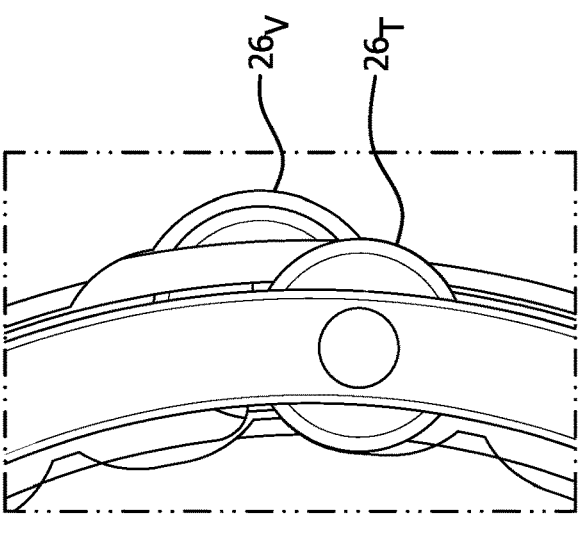
FIG. 10A is a side view taken along lines 10A-10A in FIG. 10 illustrating a roll relative to the clutch housing, the hub engaged to the inner front wheel and its associated roll cage showing the roll in the forward engagement position.

The movement of the disengaged roller assembly 28 relative to the roller assembly 28 that is engaged to the clutch housing 24 will stop when the teeth 54 engage the walls of the slots 32, preventing further movement of the disengaged roller assembly 28 relative to the engaged roller assembly 28. The difference in the circumferential width W1 of the teeth 54 and the width W2 of the slots 32 is chosen so that with the roller assembly 28 still wedged against the tapered portion 26$_T$, the rolls 34 of other roller assembly 28 are positioned in the centers of the valleys 26$_V$. Referring to FIGS. 10, 10A and 10B, As the wheel FW$_R$ continues to drive the hub 40 faster than the engaged hub 28 and the housing 24, the cusps 44$_C$ at the rear edges of the recessed channels 44 will push against the rolls 34 in roller assembly 28. Because those rolls are in the valleys 26$_V$, they are held in place only by the spring 36. Each roll 34 will, therefore, be lifted outwards by the cusp 44$_C$ until the cusp 44$_C$ passes underneath the roll 34 (FIG. 10B). The roll 34 will then drop into the next recessed channel 44. This will happen repeatedly, as long as the vehicle is turning and the wheel FW$_R$ is moving faster than wheel FW$_L$.

It is expected that any audible click as the rolls drop into the recessed channels 44 will in practice be imperceptible over the normal noise of operation of vehicle, especially if motor is an internal combustion engine.

Figures 11, 11A, 11B:
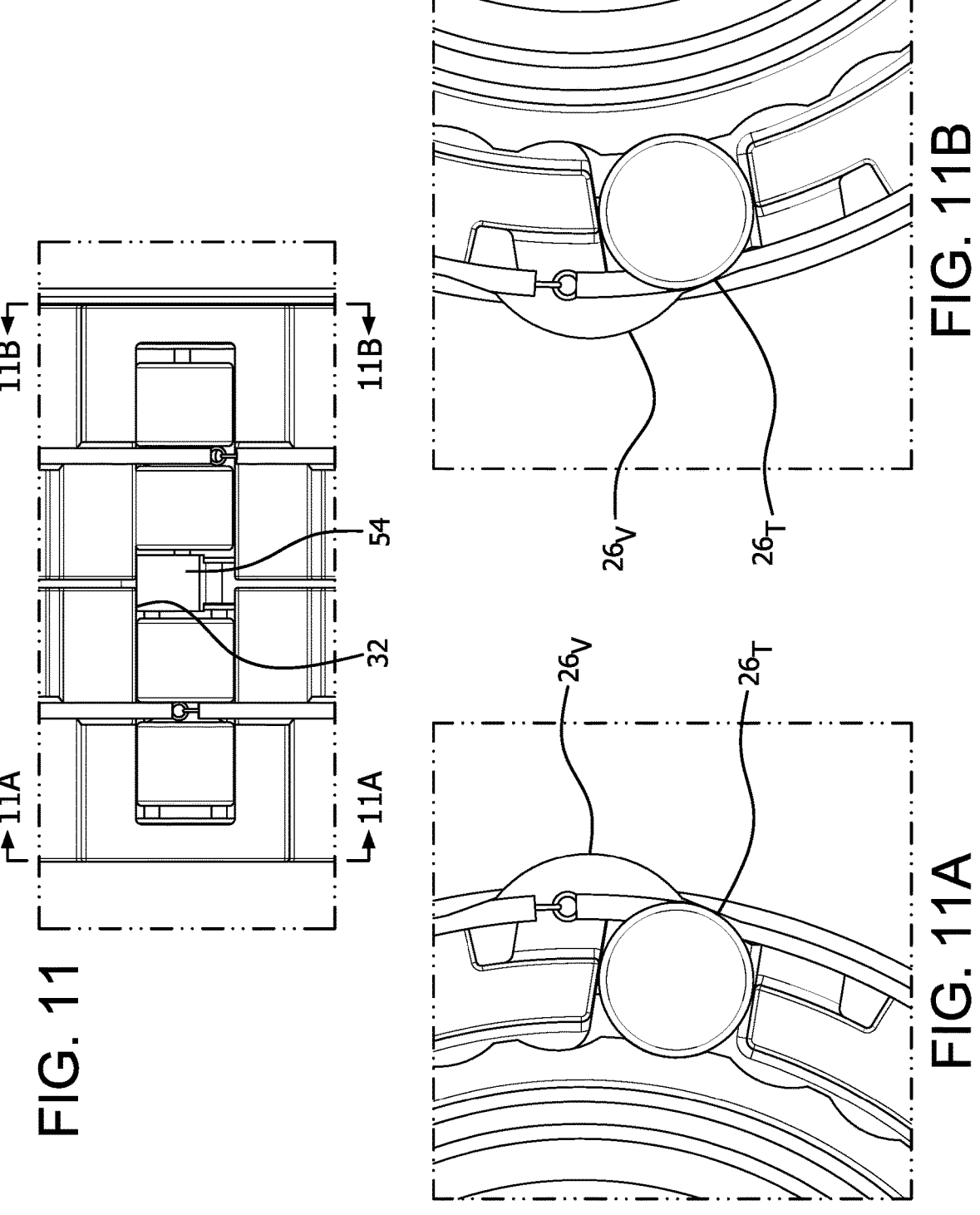
FIGS. 11, 11A and 11B are similar to the arrangement of FIGS. 8, 8A and 8B, but with slightly different contoured surfaces on the clutch housing.
Figures 12, 12A, 12B:
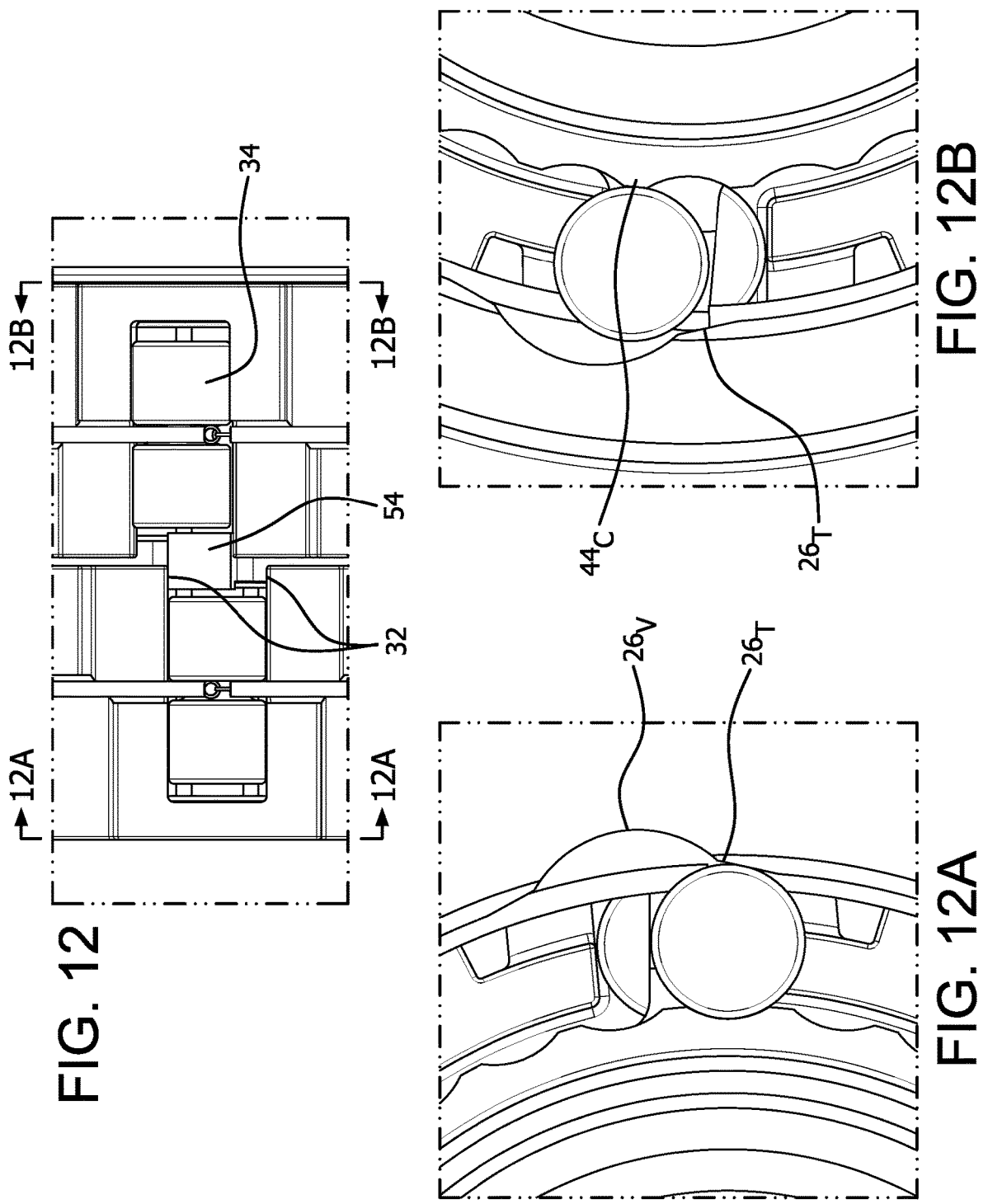
FIGS. 12, 12A and 12B are similar to the arrangement of FIGS. 10, 10A and 10B, but with the contoured surfaces on the clutch housing shown in FIGS. 11A and 11B.

Upon reentering a straight path following the turn, the rotational speed of the overrunning drive axle segment will equalize with the rotational speed of the driven drive axle segment and the clutch housing 24. See, FIGS. 11, 11A and 11B. The equalization of the relative speeds causes the rolls 34 to once again wedge between the tapered portion 26$_T$ of the clutch housing 24 and the respective hub 38, 40 in the forward-engagement position, whereupon both axles are again driven by the input pinion gear 18.

Figures 9A, 9B:
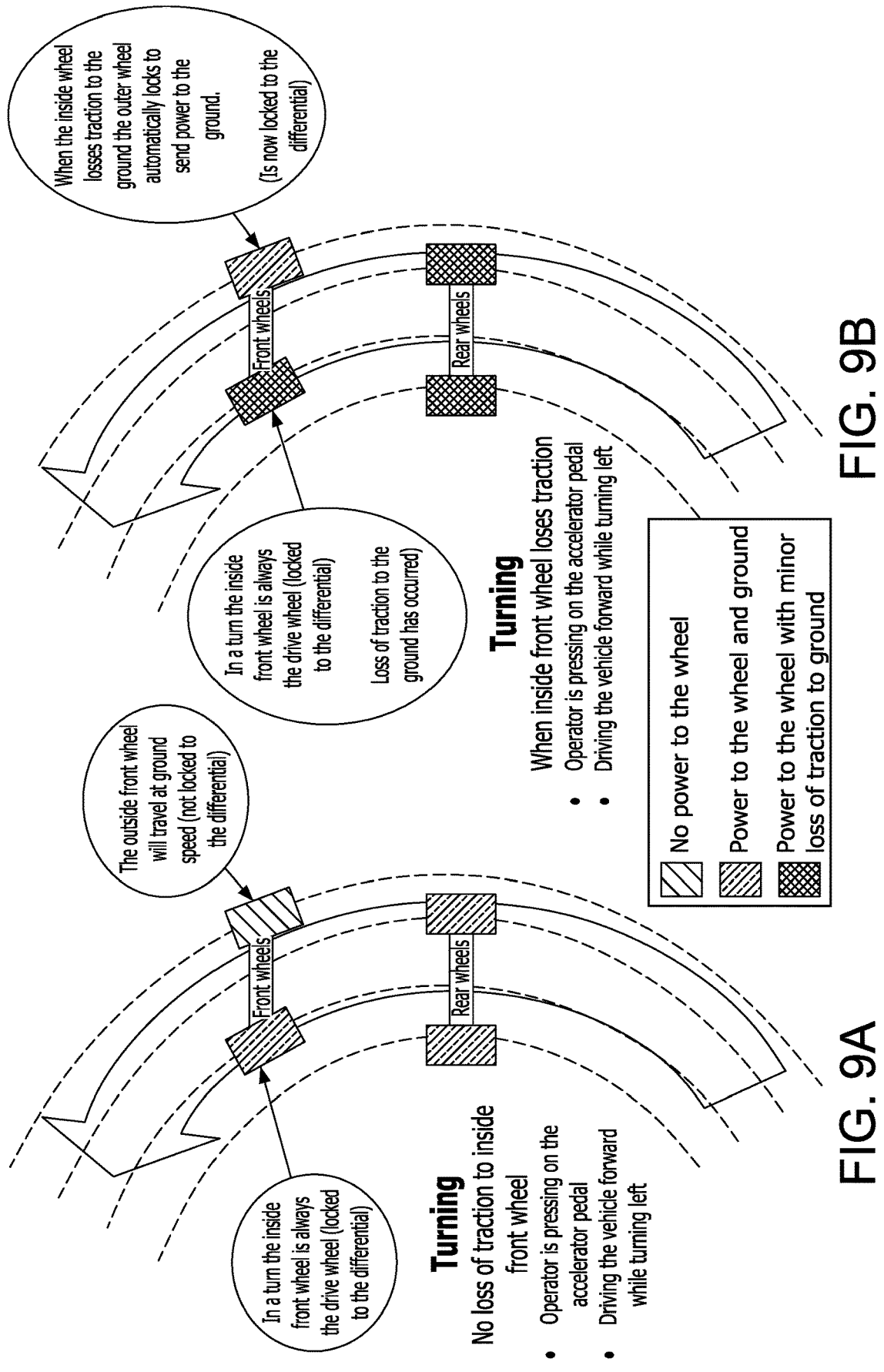
FIG. 9A is a schematic representation of a four wheel drive vehicle according to the present invention with the vehicle driving around a turn with both rear wheels and the inner front wheel providing traction.
FIG. 9B illustrates the vehicle when the rear wheels and inner front wheel lose traction, and the outer front wheel provides traction.

In the event that the inside wheel (e.g., FW$_L$) loses traction in a turn, the ground speed of the outer wheel (e.g., FW$_R$) will cause it to rotate its roll cage until the rolls 34 associated with the roll cage assembly 28 for the outer wheel engage with the clutch housing (wedge) thereby providing torque to the outer front wheel. See. FIG. 9B.

The above discussion was with respect to a left turn. Because of the symmetry of the clutch 14, an exactly similar mirror-image process will occur during a right turn.

As discussed above, the contour surface 26 includes reverse-engagement surfaces, which are the tapered portions 26$_T$ opposite the forward-engagement surfaces associated with the forward-engagement position. As a result, the clutch is bi-directional, permitting it to be reversibly driven, and functions in reverse exactly the same way as it functions in forward motion. For example, if the vehicle in the illustrated embodiment is shifted to reverse, the input gear would turn the opposite way from the discussion above. Thus, the rolls would engage with the tapered portions 26$_T$ associated with the reverse-engagement position. The bi-directional clutch assembly 14 according to the present embodiment permits torque transfer (driving) equally in such a reverse direction. Furthermore, as with the forward driving of the vehicle, the present invention also permits overrunning in the reverse direction.

Another aspect of the bi-directional clutch according to the present embodiment is that it permits backdriving, which has particular importance in situations where it is necessary or desirable to prevent the wheels from rotating faster than the input pinion 16. For example, when the vehicle is being operated on a descending slope, the speed of the wheels FW$_L$, FW$_R$ may tend to go faster than the speed dictated by the input pinion 16. In a vehicle with conventional single direction overrunning clutches, the wheels would then overrun and the machine would be free-wheeling (uncontrolled). In the clutch assembly 14 shown in the drawings, if both wheels FW$_L$, FW$_R$ overrun the speed of the input pinion 16 (and the speed of the clutch housing 24), the teeth 54 and slots 32 will not engage to restrain the movement of the roller assemblies 28. Therefore, both roller assemblies 28 will advance until the rolls 34 engage the reverse-engagement tapered portions 26$_T$. In that position, the wheels FW$_L$, FW$_R$ are backdriving torque through the clutch assembly 14 into the motor, which can act as a brake on the wheels. The shift of the roll cage assemblies 28 to the reverse-engagement clutch position, therefore, provides for controlled operation of the vehicle on a descending slope, forcing the wheels FW$_L$, FW$_R$ to rotate at the same relative speed as the rotational speed of the clutch housing 24 and input pinion 16.

It should be apparent that in that reverse-engagement state the overrunning clutch assembly 14 will still operate to permit one wheel to disengage from clutch housing 24 on a turn, but now the faster-moving (outside) wheel is backdriving the motor, while the slower-moving wheel is disengaged.

As discussed above, the present invention provides a system that offers almost instantaneous engagement of the drive axle, thus transferring power (torque) from the drive shaft DS to the drive axle DA. In the event it is desired or necessary to not provide power transmission to the drive axle DA, the present invention contemplates use of a pinion disconnect assembly 100. The pinion disconnect assembly 100 provides a controllable mechanism for disconnecting the drive shaft DS from the input pinion 16 so as to prevent transmission of torque between the two components.

One embodiment of the pinion disconnect assembly 100 is illustrated in FIGS. 1, 3, 5, 5A, 5B, and 6. In this embodiment, the pinion disconnect assembly 100 includes a disconnect housing 102 that is mounted to the differential housing 12. A pinion coupler shaft 104 is located within the disconnect housing 102 with a first shaft end 104$_A$ extending out of an opening in the housing on the side opposite from where it attaches to the differential housing 12. The first shaft end 104$_A$ is configured to attach to the drive shaft DS. In the illustrated embodiment, the first shaft end 104$_A$ includes splines that mate with complementary splines formed in an end of the drive shaft DS. Other connections commonly used in drive systems could, instead, be incorporated. A bearing 106 is preferably located between a portion of the pinion coupler shaft 104 and the disconnect housing 102 so as to permit the pinion coupler shaft 104 to rotate within the disconnect housing 102.

The opposite shaft end (second shaft end) 104$_B$ of the pinion coupler shaft 104 is configured to operatively couple to the pinion input shaft 20 of the pinion input 16 through a rotary coupler 200. In an embodiment shown in FIGS. 5A and 5B, the rotary coupler 200 includes a yoke 202 and a fork 204. More specifically, in the illustrated embodiment, the second shaft end 104$_B$ includes a face gear 104$_C$ that meshes axially with a mating face gear 202$_A$ that is formed on one side of the yoke 202. The yoke 202 has an inner recess or hole 202$_B$ with internal splines that engage external splines on the pinion input shaft 20. The use of face gears and splines on the yoke 202 allows for a slidable connection to be used for controllably engaging the pinion coupler shaft 104 with the pinion input shaft 20 as needed. The yoke 202 preferably has an annual groove or neck 202$_C$ formed about part of its periphery. The fork 204 has a first end 204$_A$ that couples with the groove 202$_C$. In the illustrated embodiment, the first end 204$_A$ has a C-shaped or semi-circular shaped opening that fits within and extends partially around the circular groove 202$_C$. The yoke groove 202$_C$ allows yoke 202 to rotate within the first end 204$_A$ of the fork 204. The fork 204 is mounted so as to be able to slide axially relative to the housing 102 as the yoke 202 slides on the end of the pinion input shaft 20. As shown, in one embodiment, a guide rod 206 is mounted in the housing 102 and the fork 204 includes a hole or shaft 204$_B$ that slides on the guide rod 206. Other mechanisms could be used for guiding the fork so that it slides and is supported for axial movement as the yoke 202 slides. In addition, while the current embodiment includes meshing face gears 104C, 202A other rotary connections that are connectable and disconnectable can be used. For example, the arrangement could use meshing splined connections.

In order to provide for connection and disconnection of the pinion coupler shaft 104 to the pinion input shaft 20, the rotary coupler 200 includes a linear displacement device or linear actuator 110 that is connected to the fork 204 so as to slide the yoke 202 toward and away from the second shaft end 104$_B$ of the pinion coupler shaft 104 thus, engaging and disengaging the mating face gears 104$_C$. The linear actuator can be a stepper motor or linear screwdrive that has its actuator arm or shaft connected to the fork.

Figure 5:
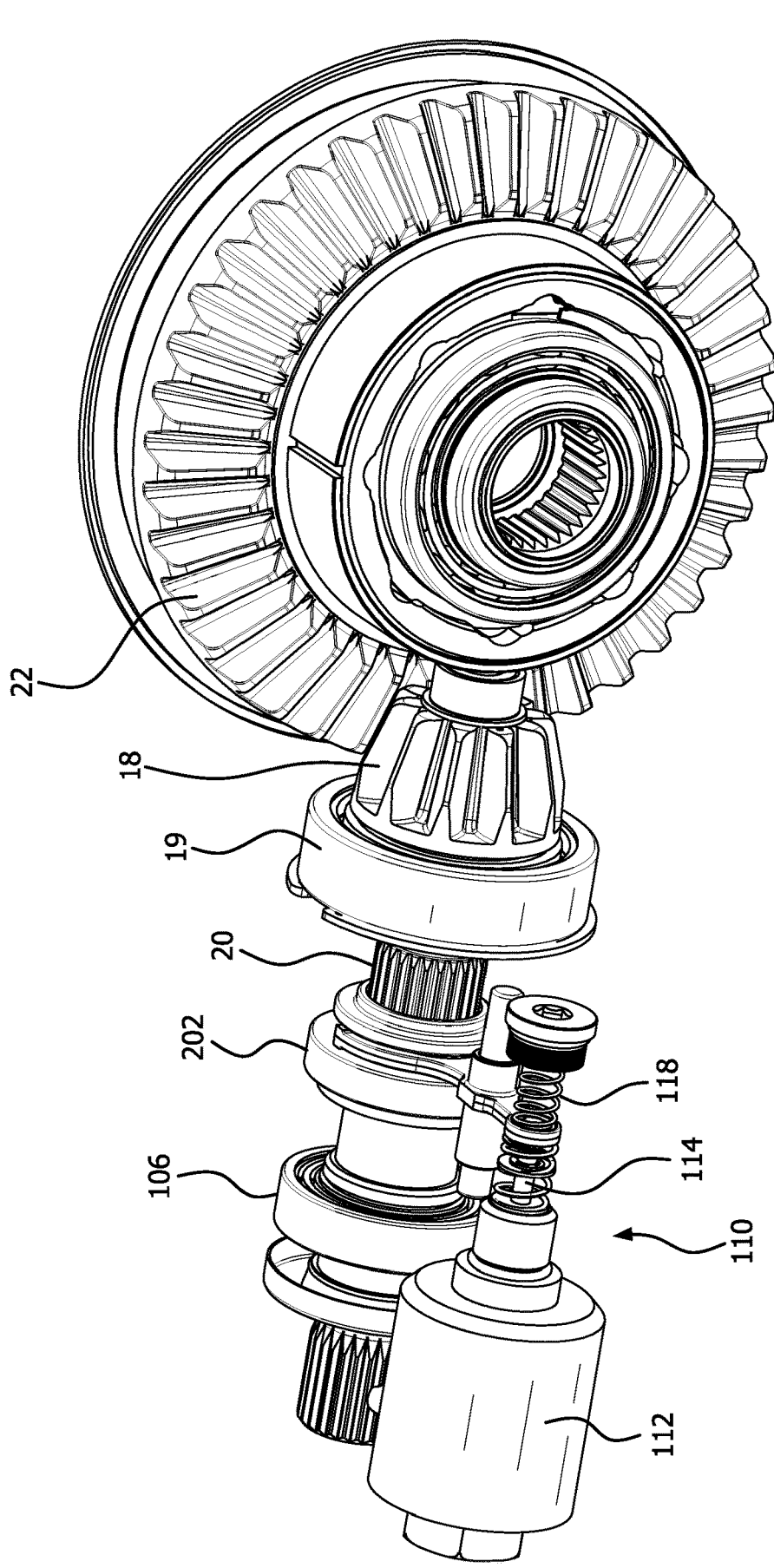
FIG. 5 is a perspective view of the differential assembly of FIG. 1 with the differential housing and actuator housing removed.
Figure 5A:
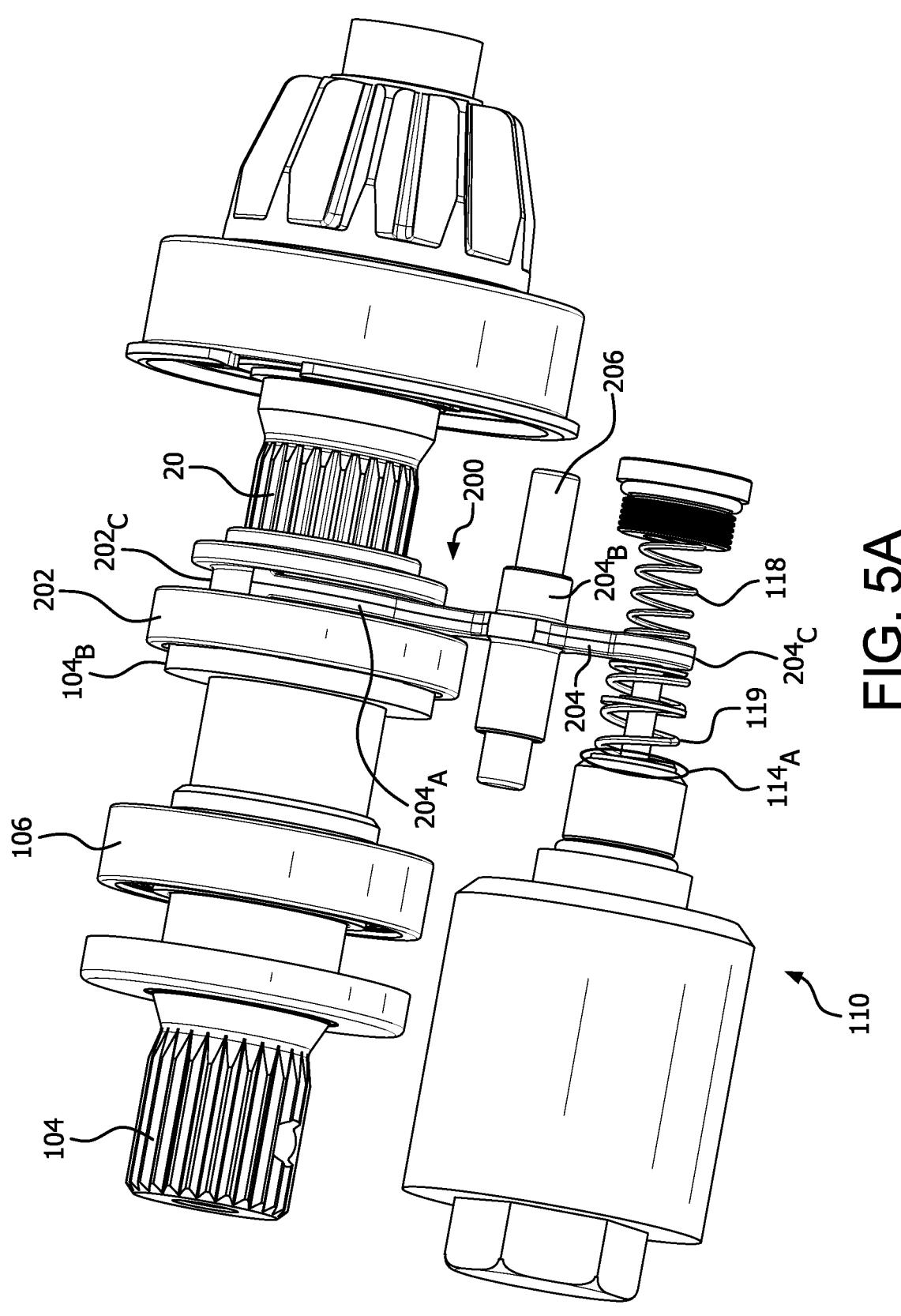
FIG. 5A illustrates the internal components of the disconnect assembly in one embodiment.
Figure 5B:
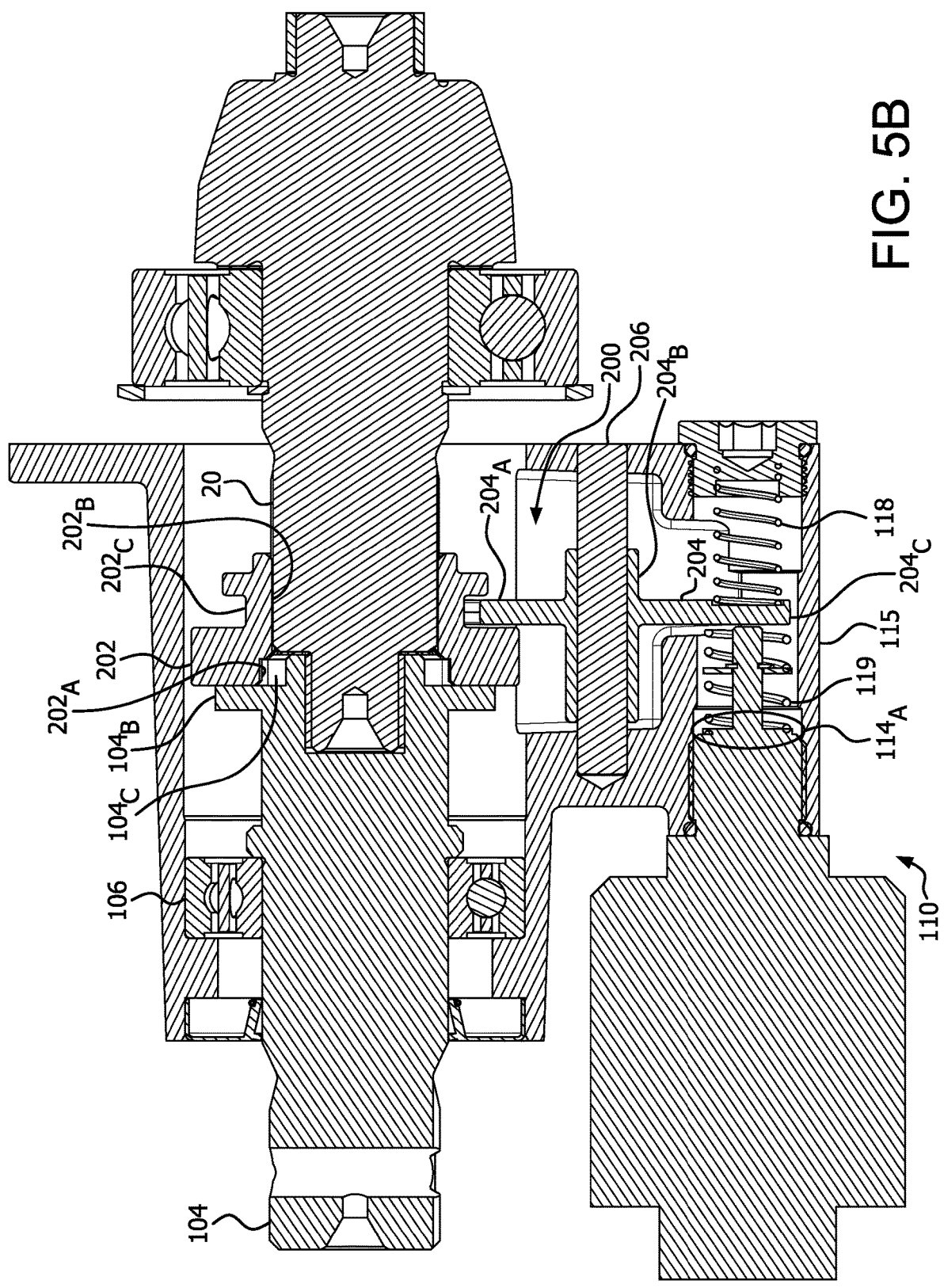
FIG. 5B is a sectional view of the disconnect assembly of FIG. 5A.
Figure 6:
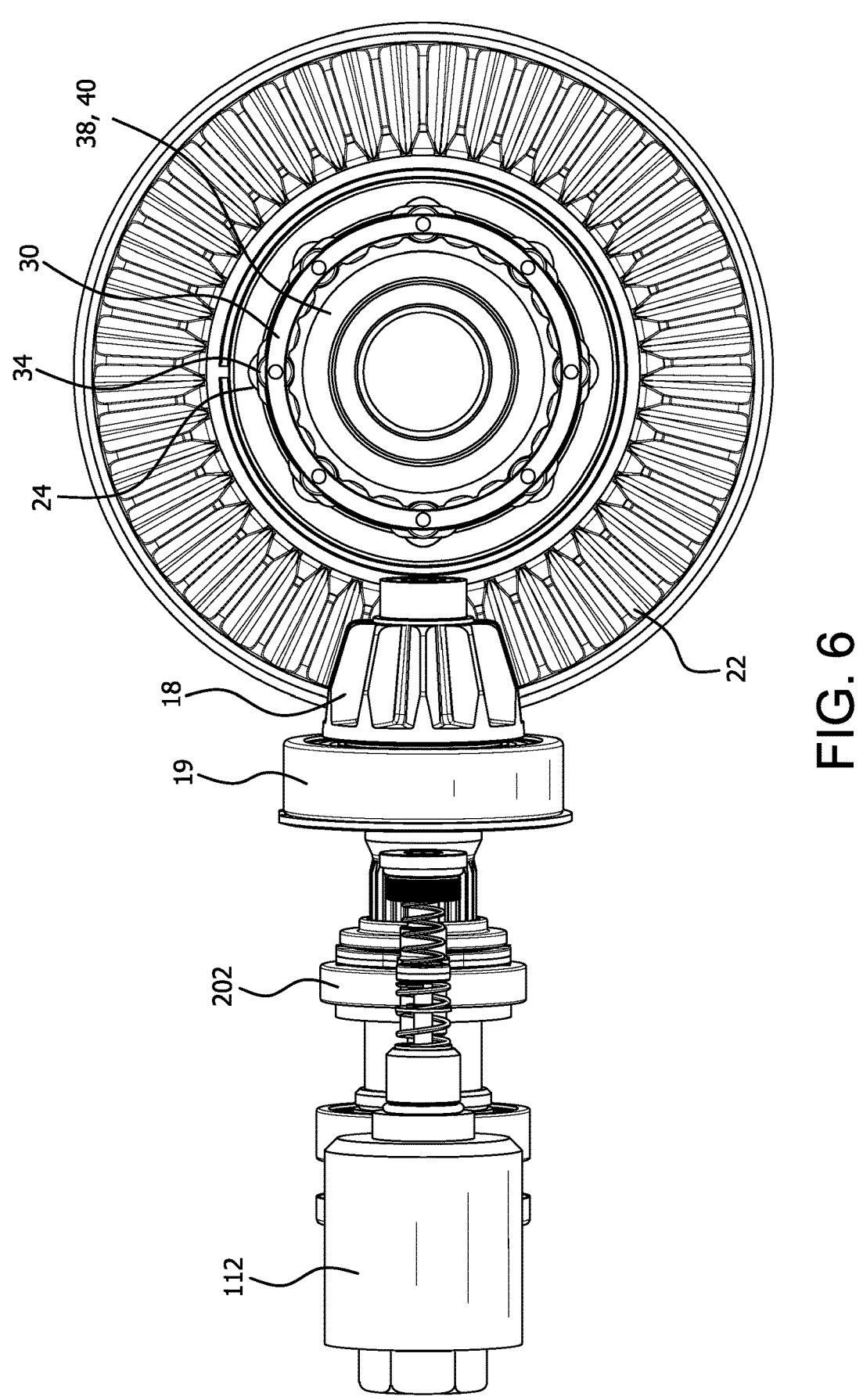
FIG. 6 is a side view of the differential assembly of FIG. 5.

One embodiment of a preferred linear actuator 110 is shown in FIGS. 5, 5A and 5B. In this embodiment, the linear actuator 110 includes a solenoid 112 which controls the translation or stroke of a solenoid shaft 114 that extends into an actuator housing 115. The side of the actuator housing 115 has an elongated slot formed on one side. A second end 204$_C$ of the fork 204 extends into the actuator housing 115 through the slot. The solenoid shaft 114 includes an end plate or disk 114$_A$ that is adjacent to and in contact with an end or portion of a first or positioning spring 119 located in the actuator housing 115. Alternately, the end of the first spring 119 could be in directed contact with the solenoid 112. The positioning spring 119 has its opposite end in contact with the one side of the second end 204$_C$ of the fork 204. The first spring 119 forces the solenoid shaft 114 into its retracted position. A second or return spring 118 is located in the actuator housing 115 on the opposite side of the second end 204$_C$ of the fork 204 than the first spring 119, between the second end 204$_C$ of the fork 204 and the actuator housing 115. The second spring 118 urges the fork 204 toward the solenoid 112 and, thus, the yoke 202 toward the pinion coupler shaft 104 so that the yoke face gear 202$_A$ engages the face gear 104$_C$ on the second shaft end 104$_B$. This is the engaged position which permits torque transfer between the drive shaft DS and the differential 10.

When voltage (power/signal) is supplied to the solenoid 112 from a control device 300 through an electrical connection 302, such as an electrical cable, to the electrical connector 304, the solenoid actuates and axially translates (extends) the solenoid shaft 114 and disk 114$_A$ which causes the first spring 119 to force the fork 202 to slide in the actuator housing 115 (away from the solenoid 112). The first end 204$_C$ of the fork causes the yoke 202 to translate axially (slide on the pinion input shaft 20 away from the pinion coupler shaft 104, thus separating the face gears 104$_C$, 202$_A$ and resulting in the decoupling of the pinion coupler shaft 104 from the pinion input shaft 20 (i.e., the rotary coupler in its decoupled state. The first and second springs 119, 118 provide a biasing force on the fork 204 and the solenoid shaft 114. As such, when power is no longer supplied to the solenoid, the biasing force of the springs urge the fork 204 and the solenoid shaft 114 to slide toward the solenoid 112, which causes the yoke 202 to slide back to the engaged (coupled) position of the rotary coupler. Of course, other arrangements can be used for controlling axial translation of the fork. For example, the solenoid shaft 114 could engage directly with the second end 204$_C$ of the fork with the return spring 118 providing the only biasing force for returning the rotary coupler 200 to its coupled position.

In this configuration, the default position has torque provided to both the front and rear drive axles (i.e., 4WD mode). In order to disconnect the front drive axle DA, power is supplied to the linear actuator 110 causing it to disconnect the pinion coupler shaft 104 from the pinion input shaft 20. Also, in the event of power loss, the drive system will default to 4WD mode. Of course, it should be recognized that the system could be easily reversed so that when no power is provided to the linear actuator 110, the pinion coupler shaft 104 is disengaged (decoupled) from the pinion input shaft 20 thereby placing the vehicle is a 2WD mode and that power must be supplied to the linear actuator 110 in order to transition to 4WD mode.

While the pinion disconnect assembly 100 is depicted in the illustrated embodiment as being located so as to connect directly to the pinion input shaft 20, it is also contemplated that the pinion disconnect assembly 100 could be located elsewhere on the drive shaft DS or could be located so as to disconnect the pinion input shaft 20 from the pinion gear 18 or configured to disconnect the pinion gear 18 from the ring gear 22.

Control of the linear actuator 110 is preferably provided by the control device 300, which may be a mechanical or electrical switch mounted in the vehicle which, when activated provides the electrical control to the linear actuator 110 along the electrical connection or cable 302 to turn on or off the linear actuator (depending on the configuration).

FIGS. 11, 11A, 11B and 12, 12A, 12B are similar to FIGS. 8, 8A, 8B and 10, 10A, 10B except that the tapered contour 26$_T$ formed in the clutch housing has a sloped surface rather than a curved surface. The slope tends to help trap and maintain the roll to wedged into the recessed channels 44. This shape of the tapered surface 26$_T$ adjusts the force vector that is acting on the roll into a direction into the recessed channel 44

In another embodiment of the invention, the differential assembly 10 does not include a pinion disconnect 100. In this embodiment the positive differential assembly is always engaged to the drive shaft DS. The features of the invention described in the above embodiments apply to this alternate embodiment. The differential and vehicle would operate as describes above. In addition, it is contemplated that this differential assembly could be used in combination with both the primary and secondary drive axles so as to supply torque to both the front and rear wheels of the vehicle.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The particular implementations shown and described herein are illustrative examples of the invention and are not intended to otherwise limit the scope of the invention in any way. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

Terms such as "about" or "approximately", unless otherwise defined or restricted in the specification, should be understood to define a variance of plus or minus 5%-10% to the numerical term referred to.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed. The various embodiments and elements can be interchanged or combined in any suitable manner as necessary.

The use of directions, such as forward, rearward, top and bottom, upper and lower are with reference to the embodiments shown in the drawings and, thus, should not be taken as restrictive. Reversing or flipping the embodiments in the drawings would, of course, result in consistent reversal or flipping of the terminology.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalent.

The invention claimed is:

1. A positive drive differential assembly comprising:

a differential housing;

an input pinion including a pinion gear and a pinion input shaft attached to the pinion gear, the pinion gear located within the differential housing with a portion of the pinion input shaft extending out of an opening in the differential housing, the pinion input shaft configured to operably engage with a drive shaft so as to permit the drive shaft to rotate the pinion shaft;

a bi-directional overrunning clutch assembly located within the differential housing and configured to engage with at least one drive axle segment, the bi-directional overrunning clutch assembly configured to transmit torque, when engaged, between the pinion gear and the drive axle segments, the bi-directional overrunning clutch assembly including:

a ring gear engaged to the pinion gear;

a clutch housing attached to or formed integral with the ring gear wherein the ring gear is positioned radially outward from an inner surface of the clutch housing, the inner surface having a contoured surface formed on at least a portion of the inner surface;

two roller clutch assemblies located radially inward from the inner surface of the clutch housing, each roller clutch assembly including a roll cage with a plurality of spaced apart slots that extend radially through the roll cage from its outer surface to its inner surface, a roll located in each slot and sized so that it can rotate within the slot, and at least one spring biasing the rolls against movement radially outward relative to the roll cage; and a roll cage coupler positioned between the two roller clutch assemblies for intermittently coupling the two roll cages to limit relative motion of the roll cages with respect to one another; and two hubs, each hub located radially inward of one of the roller clutch assemblies, the hubs being axially aligned with one another so as to rotate about a common axis, each hub configured to engage with an end of a corresponding drive axle segment, each hub located radially inward from a plurality of the rolls of an associated roller clutch assembly of the two roller clutch assemblies, each hub having a contoured exterior portion with a plurality of recessed channels formed on the contoured exterior portion of the hub, the recessed channels each extending axially along the contoured exterior portion parallel to a longitudinal axis of the hub, the recessed channels are each sized so that a portion of one of the rolls can seat within the channel, the recessed channels are spaced about the circumference of the contoured exterior portion of the hub;

the at least one spring biasing the rolls in the associated roller clutch assembly such that each of the rolls is seated in one of the recessed channels when the roll in the roller clutch assembly is not overrunning, the seating of the rolls in the recessed channels providing a connection between an associated roll cage and one of the hubs so as to cause the roll cage to initially move with the hub.

2. The positive drive differential assembly of claim 1, further comprising a pinion bearing located between a portion of the input pinion and the differential housing for permitting the input pinion to rotate with respect to the differential housing.

3. The positive drive differential assembly of claim 1, wherein pinion shaft includes a splined end located outside of the differential housing which is configured to be engaged to a mating splined connection on an end of the drive shaft.

4. The positive drive differential assembly of claim 1, wherein the ring gear is formed integral with, circumscribes and extends radially outward from an outer periphery of the clutch housing.

5. The positive drive differential assembly of claim 1, wherein at least some of the slots in each roll cage extend axially to one edge of the roll cage so as to provide a lateral opening into the slot from an axial end of the roll cage.

6. The positive drive differential assembly of claim 5, wherein the at least one spring is one spring that biases all the rolls in its roll cage assembly radially inward so as to cause the rolls to engage with the recessed channels in the associated hub.

7. A differential assembly for a four wheel drive vehicle, the four wheel drive vehicle having a primary drive axle and a secondary drive axle, the secondary drive axle having two drive axle segments, the differential assembly configured to operably couple to the secondary drive axle, the differential assembly comprising:

a differential housing;

an input pinion including a pinion gear and a pinion input shaft attached to the pinion gear, the pinion gear located within the differential housing with a portion of the pinion input shaft extending out of an opening in the differential housing, the pinion input shaft configured to operably engage with a drive shaft so as to permit the drive shaft to rotate the pinion shaft;

a bi-directional overrunning clutch assembly located within the differential housing and configured to engage with the two drive axle segments, the bi-directional overrunning clutch assembly configured to transmit torque, when engaged, between the pinion gear and the drive axle segments, the bi-directional overrunning clutch assembly including:

a ring gear engaged to the pinion gear;

a clutch housing attached to or formed integral with the ring gear wherein the ring gear is positioned radially outward from an inner surface of the clutch housing, the inner surface having a contoured surface formed on at least a portion of the inner surface;

two roller clutch assemblies located radially inward from the inner surface of the clutch housing, each roller clutch assembly including a roll cage with a plurality of spaced apart slots that extend radially through the roll cage from its outer surface to its inner surface, a roll located in each slot and sized so that it can rotate within the slot, and at least one spring biasing the rolls against movement radially outward relative to the roll cage; and a roll cage coupler positioned between the two roller clutch assemblies for intermittently coupling the two roll cages to limit relative motion of the roll cages with respect to one another; and two hubs, each hub located radially inward of one of the roller clutch assemblies, the hubs being axially aligned with one another so as to rotate about a common axis, each hub configured to engage with an end of a corresponding drive axle segment, each hub located radially inward from a plurality of the rolls of an associated roller clutch assembly of the two roller clutch assemblies, each hub having a contoured exterior portion with a plurality of recessed channels formed on the contoured exterior portion of the hub, the recessed channels each extending axially along the contoured exterior portion parallel to a longitudinal axis of the hub, the recessed channels are each sized so that a portion of one of the rolls can seat within the channel, the recessed channels are spaced about the circumference of the contoured exterior portion of the hub;

the at least one spring biasing the rolls in the associated roller clutch assembly such that each of the rolls is seated in one of the recessed channels when the roll in the roller clutch assembly is not overrunning, the seating of the rolls in the recessed channels providing a connection between an associated roll cage and one of the hubs so as to cause the roll cage to initially move with the hub;

wherein at least some of the slots in each roll cage extend axially to one edge of the roll cage so as to provide a lateral opening into the slot from an axial end of the roll cage;

wherein the inner contoured surface of the clutch housing includes a plurality of peaks and valleys, the number of valleys is at least equal in number to the number of rolls in one of the roller assemblies, wherein when no load is applied to the bidirectional overrunning clutch, each roll is located within one of the valleys with the contoured surface tapering inward toward the roll cage on either side of the roll.

8. The positive drive differential assembly of claim 1, wherein the number of recessed channels in each hub is a multiple of the number of rolls in the associated roller clutch assembly so that, in a resting position, each of the rolls is seated in one of the recessed channels.

9. The positive drive differential assembly of claim 1, wherein each of the hubs includes an axially outer end with an outer surface that is reduced in diameter with respect to the contoured exterior portion, a portion of the axial outer end of one of the hubs extending through a central opening in a cover of the differential housing and a portion of the axial outer end of the other hub extending through a central opening of a main portion of the differential housing.

10. The positive drive differential assembly of claim 9, wherein an axially inward end of one hub has a reduced diameter portion that fits within a recess in an axially inward end of the other hub.

11. A differential assembly for a four wheel drive vehicle, the four wheel drive vehicle having a primary drive axle and a secondary drive axle, the secondary drive axle having two drive axle segments, the differential assembly configured to operably couple to the secondary drive axle, the differential assembly comprising:

a differential housing;

an input pinion including a pinion gear and a pinion input shaft attached to the pinion gear, the pinion gear located within the differential housing with a portion of the pinion input shaft extending out of an opening in the differential housing, the pinion input shaft configured to operably engage with a drive shaft so as to permit the drive shaft to rotate the pinion shaft;

a bi-directional overrunning clutch assembly located within the differential housing and configured to engage with the two drive axle segments, the bi-directional overrunning clutch assembly configured to transmit torque, when engaged, between the pinion gear and the drive axle segments, the bi-directional overrunning clutch assembly including:

a ring gear engaged to the pinion gear;

a clutch housing attached to or formed integral with the ring gear wherein the ring gear is positioned radially outward from an inner surface of the clutch housing, the inner surface having a contoured surface formed on at least a portion of the inner surface;

two roller clutch assemblies located radially inward from the inner surface of the clutch housing, each roller clutch assembly including a roll cage with a plurality of spaced apart slots that extend radially through the roll cage from its outer surface to its inner surface, a roll located in each slot and sized so that it can rotate within the slot, and at least one spring biasing the rolls against movement radially outward relative to the roll cage; and a roll cage coupler positioned between the two roller clutch assemblies for intermittently coupling the two roll cages to limit relative motion of the roll cages with respect to one another; and two hubs, each hub located radially inward of one of the roller clutch assemblies, the hubs being axially aligned with one another so as to rotate about a common axis, each hub configured to engage with an end of a corresponding drive axle segment, each hub located radially inward from a plurality of the rolls of an associated roller clutch assembly of the two roller clutch assemblies, each hub having a contoured exterior portion with a plurality of recessed channels formed on the contoured exterior portion of the hub, the recessed channels each extending axially along the contoured exterior portion parallel to a longitudinal axis of the hub, the recessed channels are each sized so that a portion of one of the rolls can seat within the channel, the recessed channels are spaced about the circumference of the contoured exterior portion of the hub;

the at least one spring biasing the rolls in the associated roller clutch assembly such that each of the rolls is seated in one of the recessed channels when the roll in the roller clutch assembly is not overrunning, the seating of the rolls in the recessed channels providing a connection between an associated roll cage and one of the hubs so as to cause the roll cage to initially move with the hub;

wherein at least some of the slots in each roll cage extend axially to one edge of the roll cage so as to provide a lateral opening into the slot from an axial end of the roll cage;

wherein the roll cage coupler includes a center ring with a plurality of teeth extending radially outward from the ring, the number of teeth is the same as or less than the number of slots, each tooth fits into one of the open ends of one of the slots in each of the roll cages, and wherein each tooth has a circumferential width that is less than a width of the open end of the slot.

12. The positive drive differential assembly of claim 1, wherein the roll cage coupler includes a center ring with a plurality of teeth extending radially outward from the ring, each tooth fits into a receptacle in at least one of the roll cages, and wherein each tooth has a circumferential width that is less than a width of an associated receptacle.

13. The positive drive differential assembly of claim 12, wherein the receptacle is one of the slots in the roll cage.

14. The positive drive differential assembly of claim 1, wherein the roll cage coupler is defined by a plurality of teeth extending axially outward from at least one of the roll cages, each tooth fitting into a receptacle in the other roll cage, and wherein each tooth has a circumferential width that is less than a width of an associated receptacle.

15. The positive drive differential assembly of claim 1, wherein the differential assembly is part of a four wheel drive vehicle, the four wheel drive vehicle having a primary drive axle and a secondary drive axle, wherein the positive drive differential assembly is operably coupled to the secondary drive axle.

16. The positive drive differential assembly of claim 15, wherein there is a second positive drive differential assembly that is operably coupled to the primary drive axle.

17. The positive drive differential assembly of claim 1, wherein a support is provided between each hub and the differential housing.

18. A differential assembly for a four wheel drive vehicle, the four wheel drive vehicle having a primary drive axle and a secondary drive axle, the secondary drive axle having two drive axle segments, the differential assembly configured to operably couple to the secondary drive axle, the differential assembly comprising:

a differential housing;

an input pinion including a pinion gear and a pinion input shaft attached to the pinion gear, the pinion gear located within the differential housing with a portion of the pinion input shaft extending out of an opening in the differential housing, the pinion input shaft configured to operably engage with a drive shaft so as to permit the drive shaft to rotate the pinion shaft;

a bi-directional overrunning clutch assembly located within the differential housing and configured to engage with the two drive axle segments, the bi-directional overrunning clutch assembly configured to transmit torque, when engaged, between the pinion gear and the drive axle segments, the bi-directional overrunning clutch assembly including:

a ring gear engaged to the pinion gear;

a clutch housing attached to or formed integral with the ring gear wherein the ring gear is positioned radially outward from an inner surface of the clutch housing, the inner surface having a contoured surface formed on at least a portion of the inner surface;

two roller clutch assemblies located radially inward from the inner surface of the clutch housing, each roller clutch assembly including a roll cage with a plurality of spaced apart slots that extend radially through the roll cage from its outer surface to its inner surface, a roll located in each slot and sized so that it can rotate within the slot, and at least one spring biasing the rolls against movement radially outward relative to the roll cage; and a roll cage coupler positioned between the two roller clutch assemblies for intermittently coupling the two roll cages to limit relative motion of the roll cages with respect to one another; and two hubs, each hub located radially inward of one of the roller clutch assemblies, the hubs being axially aligned with one another so as to rotate about a common axis, each hub configured to engage with an end of a corresponding drive axle segment, each hub located radially inward from a plurality of the rolls of an associated roller clutch assembly of the two roller clutch assemblies, each hub having a contoured exterior portion with a plurality of recessed channels formed on the contoured exterior portion of the hub, the recessed channels each extending axially along the contoured exterior portion parallel to a longitudinal axis of the hub, the recessed channels are each sized so that a portion of one of the rolls can seat within the channel, the recessed channels are spaced about the circumference of the contoured exterior portion of the hub;

the at least one spring biasing the rolls in the associated roller clutch assembly such that each of the rolls is seated in one of the recessed channels when the roll in the roller clutch assembly is not overrunning, the seating of the rolls in the recessed channels providing a connection between an associated roll cage and one of the hubs so as to cause the roll cage to initially move with the hub.

19. A four wheel drive vehicle comprising:

a motor operably coupled to a transmission, the transmission configured to transmit power from the engine to primary and secondary drive shafts;

the primary drive shaft having a first end operably connected to the transmission for receiving rotary motion from the transmission, and a second end connected to a primary differential;

a primary drive axle including two primary drive axle segments, each primary drive axle segment having one end connected to a ground engaging wheel and the opposite end operably connected to the primary differential, the primary differential transmitting rotary motion from the primary drive shaft to the primary drive axle;

the secondary drive shaft having a first end operably connected to the transmission for receiving rotary motion from the transmission, and a second end connected to the pinion input shaft of the positive drive differential assembly of claim 1; and a secondary drive axle including two secondary drive axle segments, each secondary drive axle segment having one end connected to a ground engaging wheel and the opposite end operably connected to one of the hubs in the positive drive differential assembly, the positive drive differential assembly configured to transmit rotary motion from the secondary drive shaft to the secondary drive axle.

20. A four wheel drive vehicle comprising:

a motor operably coupled to a transmission, the transmission configured to transmit power from the engine to primary and secondary drive shafts;

two positive drive differential assemblies according to claim 1;

the primary drive shaft having a first end operably connected to the transmission for receiving rotary motion from the transmission, and a second end connected to the pinion input shaft of one of the positive drive differential assemblies; and the secondary drive shaft having a first end operably connected to the transmission for receiving rotary motion from the transmission, and a second end connected to the pinion input shaft of the other positive drive differential assembly.

21. The positive drive differential assembly of claim 1, wherein the bi-directional overrunning clutch assembly is configured to automatically engage with the at least one drive axle segment.

\* \* \* \* \*